(12) United States Patent
Matsui et al.

(10) Patent No.: US 9,295,110 B2
(45) Date of Patent: Mar. 22, 2016

(54) INDUCTIVE HEATING DEVICE

(75) Inventors: Eiji Matsui, Osaka (JP); Akira Kataoka, Shiga (JP); Takehiko Shigeoka, Nara (JP)

(73) Assignee: Panasonic Intellectual Property Management Co., Ltd. (JP)

( * ) Notice: Subject to any disclaimer, the term of this patent is extended or adjusted under 35 U.S.C. 154(b) by 997 days.

(21) Appl. No.: 13/502,626

(22) PCT Filed: Oct. 21, 2010

(86) PCT No.: PCT/JP2010/006242
§ 371 (c)(1),
(2), (4) Date: May 22, 2012

(87) PCT Pub. No.: WO2011/048816
PCT Pub. Date: Apr. 28, 2011

(65) Prior Publication Data
US 2012/0223070 A1    Sep. 6, 2012

(30) Foreign Application Priority Data

Oct. 23, 2009    (JP) .................................. 2009-244008
Nov. 10, 2009    (JP) .................................. 2009-256743

(51) Int. Cl.
*H05B 6/36*    (2006.01)
*H05B 6/12*    (2006.01)

(52) U.S. Cl.
CPC ............ *H05B 6/1254* (2013.01); *H05B 6/1263* (2013.01); *H05B 6/1272* (2013.01); *H05B 2206/022* (2013.01); *Y02B 40/126* (2013.01)

(58) Field of Classification Search
CPC ... H05B 6/00; H05B 6/12–6/129; H05B 6/36; H05B 6/365

USPC .............. 219/618, 620, 621, 622, 623, 624; 99/451
See application file for complete search history.

(56) References Cited

U.S. PATENT DOCUMENTS 4,467,162 A * 8/1984 Kondo et al. ................. 219/622
5,129,314 A * 7/1992 Hu ................................. 99/422
(Continued)

FOREIGN PATENT DOCUMENTS

CN    1596559 A    3/2005
CN    2746701 Y    12/2005
(Continued)

OTHER PUBLICATIONS

International Preliminary Report on Patentability in corresponding International Application No. PCT/JP2010/006242, and English translation thereof, dated May 3, 2012, 7 pages and 10 pages respectively.

(Continued)

*Primary Examiner* — David Angwin
*Assistant Examiner* — Michael Laflame, Jr.
(74) *Attorney, Agent, or Firm* — Brinks Gilson & Lione

(57) ABSTRACT

An inductive heating device is structured such that a coil base and ferrites placed under a heating coil in the vertical direction are flushed with each other at their lower surfaces and are directly placed on a heat dissipation plate. A heat conductive member is charged between the ferrites and an electrical insulating member sandwiched between the heating coil and the ferrites, at least at a portion thereof, so that thickness variations in the ferrites are absorbed thereby, which realizes a state where they are thermally coupled to each other from the heating coil to the heat dissipation plate.

18 Claims, 15 Drawing Sheets

(56) References Cited

U.S. PATENT DOCUMENTS

| | | | | |
|---|---|---|---|---|
| 5,428,207 | A * | 6/1995 | Essig | H05B 6/1254 219/622 |
| 5,430,273 | A * | 7/1995 | Bogdanski | H05B 6/1263 219/624 |
| 5,488,214 | A * | 1/1996 | Fettig et al. | 219/127 |
| 5,603,858 | A * | 2/1997 | Wyatt | A47J 39/006 126/246 |
| 5,686,006 | A | 11/1997 | Gaspard | |
| 5,866,884 | A * | 2/1999 | Cornec | H05B 6/1263 219/622 |
| 6,181,559 | B1 * | 1/2001 | Seo | 361/704 |
| 2004/0245244 | A1 | 12/2004 | Hirota et al. | |
| 2006/0000793 | A1 * | 1/2006 | Mavin | B65D 47/103 215/253 |
| 2007/0278215 | A1 * | 12/2007 | Schilling | H05B 6/1263 219/622 |
| 2010/0282737 | A1 * | 11/2010 | Acero Acero et al. | 219/600 |
| 2011/0073588 | A1 * | 3/2011 | Kusaka | H05B 6/062 219/621 |

FOREIGN PATENT DOCUMENTS

| | | |
|---|---|---|
| EP | 0936843 A2 * | 1/1999 |
| EP | 1122983 A2 | 8/2001 |
| JP | 5-251167 A | 9/1993 |
| JP | 2005-190753 A | 7/2005 |
| JP | 2005-302406 A | 10/2005 |
| JP | 2010-262884 A | 11/2010 |

OTHER PUBLICATIONS

Office Action in corresponding Chinese Application No. 201080046056.0, and English translation of a portion thereof, dated Jul. 19, 2013, 8 pages.

International Search Report for International Application No. PCT/JP2010/006242, dated Feb. 1, 2011, 3 pages.

Extended European Search Report in corresponding European Application No. 10824668.7, dated Apr. 15, 2015, 7 pages.

* cited by examiner

INDUCTIVE HEATING DEVICE

This application is a 371 application of PCT/JP2010/006242 having an international filing date of Oct. 21, 2010, which claims priority to JP2009-244008 filed Oct. 23, 2009 and JP2009-256743 filed Nov. 10, 2009, the entire contents of which are incorporated herein by reference.

TECHNICAL FIELD

The present invention relates to inductive heating devices for performing heating using the principle of electromagnetic induction and, more particularly, relates to cooling structures for cooling induction heating coils for use in inductive heating devices.

BACKGROUND ART

In recent years, induction heating cookers have been widely used in ordinary homes, as cooking devices employing safe and clean heat sources which use no fire and exhaust no combustion gas (for example, European Patent Application Publication No. 1122983; Patent Literature 1). Further, such induction heating cookers have higher heating efficiencies than those of heating cooking utilizing combustion gas as heat sources. However, the heating efficiency varies depending on the relative permeability and the specific resistance of the material of a cooking container, which is a to-be-heated object. Therefore, under conditions with relatively-lower heating efficiencies, greater heat losses are induced, which causes components such as induction heating coils to generate greater amounts of heat. Therefore, in order to perform stabilized heating cooking, it is important to provide a cooling structure for cooling the induction heating coils.

Conventionally, as structures for cooling induction heating coils in induction heating cookers of this type, there has been one disclosed in Unexamined Japanese Patent Publication No. 2005-302406 (Patent Literature 2), for example. FIG. 16 is a side cross-sectional view illustrating a conventional induction heating cooker disclosed in Patent Literature 2. As illustrated in FIG. 16, the induction heating cooker disclosed in Patent Literature 2 is provided with a coil unit 100 for induction heating, just under a top plate 50 for placing a to-be-heated object thereon. The coil unit 100 is constituted by an induction heating coil 200, ferrites 300 on which the induction heating coil 200 is placed, a heat dissipation plate 400 in contact with the ferrites 300, and a coil base 500 holding the ferrites 300 and the heat dissipation plate 400.

In the conventional induction heating cooker illustrated in FIG. 16, the plural ferrites 300 are radially placed and held by the coil base 500, and the induction heating coil 200 is placed on the ferrites 300 in contact with each other. The heat dissipation plate 400 is provided with plural holes 400a and 400b for passing cooling air X therethrough, and the cooling air X comes into contact with the heat dissipation plate 400 to cool the heat dissipation plate 400 and, also, comes into direct contact with the induction heating coil 200 to cool the induction heating coil 200. With such a conventional induction heating cooker having the aforementioned structure, the heating coil 200 is cooled by being brought into direct contact with the cooling air X and, also, heat generated from the induction heating coil 200 is partially transmitted to the heat dissipation plate 400 through the ferrites 300 and, thus, the heat is dissipated from the heat dissipation plate 400.

Patent Literature 1: European Patent Application Publication No. 1122983
Patent Literature 2: Unexamined Japanese Patent Publication No. 2005-302406

SUMMARY OF THE INVENTION

Technical Problem

Conventional induction heating cookers as described above have been structured such that heat from an induction heating coil is partially transmitted to a heat dissipation plate through ferrites, which requires the induction heating coil, the ferrites and the heat dissipation plate to be certainly and thermally coupled to each other. Such ferrites are fabricated through sintering and, therefore, have size variations of about ±10% and, further, have shape variations due to warpage induced therein. For example, ferrites with a thickness of 5 mm have size variations of about ±0.7 to 0.8 mm, in the thicknesswise direction. In cases of employing a plurality of ferrites having such variations, as an intermediate member for heat conduction from an induction heating coil to a heat dissipation plate, some of the ferrites may have such shapes as to prevent the induction heating coil and the heat dissipation plate from being thermally coupled to each other. This largely degrades such conventional induction heating cookers in cooling ability. This causes individual cookers to have different cooking abilities. As described above, such cooling structures in conventional induction heating cookers may have different cooling abilities, which have risked inducing the significant problem that individual products are different from each other, in terms of performance.

Further, conventional induction heating cookers as described above include a coil unit incorporating an induction heating coil, ferrites and a heat dissipation plate, wherein there is placed a cooling space for passing cooling air therethrough inside the coil unit, which has increased the size of the coil unit, particularly the thicknesswise size, which is the size in the vertical direction. This has been a significant problem in view of thickness reduction in the entire product.

Further, since conventional induction heating cookers as described above are structured such that an induction heating coil is directly placed on ferrites, these conventional induction heating cookers have had problems as follows. Such ferrites are electric conductive members, an induction heating coil induces electric potentials between the respective coils (between the respective turns) therein, and, thus, a larger electric potential difference is induced between an outermost turn and an innermost turn in the induction heating coil. Since an induction heating coil having such a large electric potential difference therein is directly placed on ferrites, there has been induced the problem of degradation of electrical insulation, only with enamel layers which have been generally provided on the wound wires in the induction heating coil.

The present invention was made in order to overcome various types of problems in conventional induction heating cookers as described above, and aims at providing an inductive heating device which is capable of efficiently cooling heat generated from induction heating coils and capable of having a reduced size, particularly a reduced thickness, and a reduced space therein.

Solution to Problem

In order to overcome the aforementioned problems for attain the object, in a first aspect of the present invention, there is provided an inductive heating device including: a coil unit including a heating coil for heating a to-be-heated object, a plurality of ferrites placed under the heating coil in a vertical direction, and a coil base having plural housing holes which house the plural ferrites respectively; and a heat dissipation plate for directly placing the coil unit thereon, wherein the coil unit has a placement surface formed from a lower surface of the coil base in the vertical direction and lower surfaces of the plural ferrites housed in the housing holes in the coil base in the vertical direction which are flushed with each other, and the coil unit is placed on a flat surface of the heat dissipation plate such that the placement surface and the flat surface are in a surface contact with each other, and there is placed a member having an electrical insulation function and a heat conduction function, between the heating coil and the ferrites. With the inductive heating device having the aforementioned structure in the first aspect, the coil base and the ferrites are flushed with each other at their lower surfaces, which enables thermally and certainly coupling the entire coil unit to the heat dissipation plate. Further, it is possible to absorb size variations in the ferrites in the thicknesswise direction through the heat conductive member. Further, the heating coil and the ferrites are thermally coupled to each other through the heat conductive member, and heat from the heating coil is transmitted from the heating coil to the heat dissipation plate through the ferrites having a relatively-higher heat conductivity than that of the coil base, thereby efficiently lowering the temperature of the surface of the heating coil. Further, in the present invention, the coil unit including the coil base and the ferrites which are flushed with each other at their lower surfaces is placed on the heat dissipation plate, rather than incorporating and holding the heat dissipation plate in the coil base, which enables reduction of the size and the thickness of the entire coil unit and reduction of the space therein. Further, in the present invention, the electrical insulating member is provided between the heating coil and the ferrites, thereby overcoming the problem of degradation of the electrical insulation for the heating coil.

In a second aspect of the present invention, in the inductive heating device having the structure in the aforementioned first aspect, the flat surface of the heat dissipation plate is formed to be larger than the placement surface of the coil unit and is adapted to be exposed, at an outer peripheral portion, outside the coil unit. With the inductive heating device having the aforementioned structure in the second aspect, a circulating electric current is induced in the outer peripheral portion of the heat dissipation plate, thereby reducing magnetic fields leaking from the induction heating cooker to the outside.

In a third aspect of the present invention, the inductive heating device having the structure in the aforementioned first aspect further includes a fixing member for mechanically securing the coil base and the heat dissipation plate, under the heating coil in the vertical direction. With the inductive heating device having the aforementioned structure in the third aspect, the ferrites and the heat dissipation plate, and the coil base and the heat dissipation plate are secured to each other, around the fixing member, without inducing a vacancy therebetween, at a position under the heating coil. This reduces the thermal resistances therebetween, which causes heat from the heating coil to be efficiently transmitted to the heat dissipation plate, thereby cooling the heating coil.

In a fourth aspect of the present invention, in the inductive heating device having the structure in the aforementioned first aspect, the coil base is provided with plural hooks protruded from its lower surface in the vertical direction, and the plural hooks are adapted to penetrate through plural holes formed in the heat dissipation plate and engage with portions of the heat dissipation plate. With the inductive heating device having the aforementioned structure in the fourth aspect, the coil base is provided with the hooks, which makes it easier to shape the hooks to have elasticity, thereby enabling certainly securing the heat dissipation plate to the coil base at a predetermined position.

In a fifth aspect of the present invention, in the inductive heating device having the structure in the aforementioned first aspect, the housing holes are provided with a positioning protrusion which is protruded from their edge portions, such that the plural ferrites housed in the housing holes in the coil base are in contact, at their lower surfaces, with the positioning protrusion to be flushed with the lower surface of the coil base. With the inductive heating device having the aforementioned structure in the fifth aspect, the plural ferrites and the coil base are certainly flushed with each other at their lower surfaces, which allows efficient heat conduction from the placement surface of the coil unit to the flat surface of the heat dissipation plate, thereby improving the ability to cool the heating coil.

In a sixth aspect of the present invention, in the inductive heating device having the structure in any of the aforementioned first to fifth aspects, there is provided a heat conductive member having a heat conduction function between the heating coil and the ferrites, with an electrical insulating member having an electrical insulating function interposed therebetween, and a heat conductive member is embedded in areas opposing to each other, out of an area between the heating coil and the electrical insulating member and an area between the electrical insulating member and the ferrites. With the inductive heating device having the aforementioned structure in the sixth aspect, concavities and convexities induced by strands of wires of the heating coil are absorbed, which causes the heating coil and the ferrites to be coupled to each other more certainly, with the electrical insulating member interposed therebetween, thereby further increasing the heat transfer efficiency.

In a seventh aspect of the present invention, in the inductive heating device having the structure in any of the aforementioned first to fifth aspects, the member having the electrical insulating function is an adhesive agent having an electrical insulating property, and the adhesive agent also functions as a member having a heat conduction function. With the inductive heating device having the aforementioned structure in the seventh aspect, it is possible to reduce the distance between the heating coil and the ferrites, which enables further reducing the thickness of the entire coil unit and the space therein, thereby further improving the property of transferring heat to the heat dissipation plate. Further, with this structure, the heating coil and the ferrites are directly adhered to each other, which can certainly integrate them, thereby simplifying the structure and improving the assembly operations. Further, by using a material with heat resistance as the electrical insulating member, it is possible to offer an effect of maintaining the electrical insulation even in the event of abnormal heat generation from the heating coil.

In an eighth aspect of the present invention, in the inductive heating device having the structure in any of the first to fifth aspects, the heat dissipation plate is adapted to be cooled by cooling air from a blower, such that the cooling air is caused to come into contact with only the lower surface of the heat dissipation plate in the vertical direction. With the inductive heating device having the aforementioned structure in the eighth aspect, the heat dissipation plate is cooled by the blower, which can lower the temperature of the surface of the heating coil with higher efficiency.

In a ninth aspect of the present invention, in the inductive heating device having the structure in any of the aforementioned first to fifth aspects, there is placed a control circuit for controlling an output of the heating coil in an area under the heat dissipation plate in the vertical direction, and cooling air from the blower is brought into contact with heat generating components in the control circuit and the lower surface of the heat dissipation plate in the vertical direction, for cooling the heat generating components and the heat dissipation plate. With the inductive heating device having the aforementioned structure in the ninth aspect, cooling air from the blower is caused to cool both the heat dissipation plate and the heat generating components in the control circuit, which enables efficiently cooling them with the single blower, thereby enabling reduction of the quantity of cooling air and, thus, reducing noise. Further, in this aspect, it is possible to reduce the space of the blower, thereby realizing reduction of the size and the thickness of the entire induction heating cooker.

In a tenth aspect of the present invention, in the inductive heating device having the structure in any of the aforementioned first to fifth aspects, the heat dissipation plate is formed such that the vertically-projected area of its flat surface is larger than the vertically-projected area of the heating coil, and the flat surface of the heat dissipation plate is placed in an area outside an outer periphery of the heating coil. With the inductive heating device having the aforementioned structure in the tenth aspect, the projected area of the heat dissipation plate is made larger than the projected area of the heating coil, which makes the surface area of the heat dissipation plate larger, thereby improving the cooling performance and, also, reducing magnetic fields leaking downwardly from the heat dissipation plate.

In an eleventh aspect of the present invention, in the inductive heating device having the structure in any of the aforementioned first to fifth aspects, the heat dissipation plate is provided with a concavity and convexity in its portion which is not in contact with the coil unit. With the inductive heating device having the aforementioned structure in the eleventh aspect, the heat dissipation plate has an increased surface area, which can further improve the cooling performance. Further, the heat dissipation plate is made to have larger rigidity and, thus, is made to be less prone to deform. This enables supporting the coil unit at a designed position with a minimum supporting member and, further, enables reduction of variations in the distance between the heating coil and the to-be-heated object, thereby stabilizing the heating performance.

In a twelfth aspect of the present invention, in the inductive heating device having the structure in the aforementioned third aspect, the heating coil comprises a plurality of substantially-concentric induction heating coils, and there is provided the fixing member for mechanically securing the heat dissipation plate and the coil base which are placed under the heating coil in the vertical direction, at a position under a substantially-midway point on a radial width of each induction heating coil. With the inductive heating device having the aforementioned structure in the twelfth aspect, it is possible to prevent the occurrence of vacancies at positions in the heat dissipation plate which face the heating coil, which can reduce the thermal resistance between the coil base and the heat dissipation plate, thereby improving the cooling performance.

In a thirteenth aspect of the present invention, in the inductive heating device having the structure in the aforementioned third aspect, there are provided a plurality of the fixing members, and the distances between the respective fixing members are substantially equal distances in a circumferential direction of the heating coil. With the inductive heating device having the aforementioned structure in the thirteenth aspect, it is possible to integrate the coil base with the heat dissipation plate uniformly in the circumferential direction, which reduces the temperature distribution gradients in the circumferential direction in the heat dissipation plate, thereby increasing the cooling efficiency.

In a fourteenth aspect of the present invention, in the inductive heating device having the structure in the aforementioned third aspect, there are provided a plurality of the fixing members, and the fixing members are placed along plural concentric circles, such that the number of the fixing members along the concentric circle in an outer-periphery side is larger than that along the concentric circle in an inner-periphery side. With the inductive heating device having the aforementioned structure in the fourteenth aspect, it is possible to uniformly integrate the entire coil base with the heat dissipation plate, which reduces the temperature distribution gradients in the heat dissipation plate, thereby increasing the cooling efficiency.

In a fifteenth aspect of the present invention, in the inductive heating device having the structure in the aforementioned fourth aspect, the plural hooks, and the portions of the heat dissipation plate which engage with the plural hooks are placed under the heating coil in the vertical direction. With the inductive heating device having the aforementioned structure in the fifteenth aspect, it is possible to make the intervals between the hooks smaller than those in cases of securing the coil base, at its outer periphery, to the heat dissipation plate, which can increase the rigidity of the heat dissipation plate. This suppresses deformations of the heat dissipation plate at the time of supporting the heat dissipation plate for placing the coil unit at a designed position, which reduces the variation in the distance between the heating coil and the to-be-heated object, thereby stabilizing the heating performance.

In a sixteenth aspect of the present invention, in the inductive heating device having the structure in the fourth aspect, the plural hooks are placed along a concentric circle in the lower surface of the coil base, at substantially even intervals in the circumferential direction. With the inductive heating device having the aforementioned structure in the sixteenth aspect, it is possible to integrate the coil unit with the heat dissipation plate uniformly in the circumferential direction, which can increase the rigidity of the heat dissipation plate. This suppresses deformations of the heat dissipation plate at the time of supporting the heat dissipation plate for placing the coil unit at a designed position, which reduces the variation in the distance between the heating coil and the to-be-heated object, thereby stabilizing the heating performance.

In a seventeenth aspect of the present invention, in the inductive heating device having the structure in the aforementioned fourth aspect, the plural hooks are placed along plural concentric circles in the lower surface of the coil base, such that the number of the hooks placed along the concentric circle in the outer periphery side is larger than that along the concentric circle in the inner periphery side, in the coil base. With the inductive heating device having the aforementioned structure in the seventeenth aspect, a larger number of the hooks are provided in the outer periphery side of the heating coil, which can substantially uniformize the number of the hooks per unit area in the lower surface of the coil unit, thereby uniformly integrating the entire coil unit with the heat dissipation plate and, also, increasing the rigidity of the heat dissipation plate. This suppresses deformations of the heat dissipation plate at the time of supporting the heat dissipation plate for placing the coil unit at a designed position, which reduces the variation in the distance between the heating coil and the to-be-heated object, thereby stabilizing the heating performance.

In an eighteenth aspect of the present invention, in the inductive heating device having the structure in the aforementioned fourth aspect, the plural hooks have respective protruding portions protruded from the lower surface of the coil base, the protruding portions are protruded in the same direction in a plane parallel to the lower surface of the coil base, there is provided a gap between the protruding portions and the lower surface of the coil base, such that the gap is set to be equal to or slightly smaller than a thickness of the heat dissipation plate, the heat dissipation plate is press-fitted, at its portions, into the gap between the lower surface of the coil base and the protruding portions of the hooks to be secured thereto, by penetrating the hooks through the holes formed in the heat dissipation plate, and sliding the heat dissipation plate in a direction opposite from the direction of the protrusion of the hooks. With the inductive heating device having the aforementioned structure in the eighteenth aspect, it is possible to secure the heat dissipation plate to the coil unit at a predetermined position, only by sliding the heat dissipation plate. Therefore, this inductive heating device has excellent assemblability and workability. Further, the coil unit can be integrated with the heat dissipation plate with no gap interposed therebetween, which can increase the rigidity of the heat dissipation plate. This suppresses deformations of the heat dissipation plate at the time of supporting the heat dissipation plate for placing the coil unit at a designed position, which reduces the variation in the distance between the heating coil and the to-be-heated object, thereby stabilizing the heating performance. Further, even in the event of thermal contraction or expansion or the like, the coil unit can be certainly integrated with the heat dissipation plate with no gap interposed therebetween, by being secured thereto through the hooks, which can reduce thermal resistance between the coil unit and the heat dissipation plate, thereby improving the cooling performance. Also, the protruding portions of the hooks can be provided with narrow ribs at their surfaces facing the lower surface of the coil base, which enables adjusting the size of the gap between the hooks and the lower surface of the coil base, thereby enabling adjusting the friction induced by the press-fitting thereinto.

In a nineteenth aspect of the present invention, in the inductive heating device having the structure in the aforementioned eighteenth aspect, the coil base and the heat dissipation plate are secured to each other through a fixing member, after the portions of the heat dissipation plate are press-fitted into the gap between the lower surface of the coil base and the protruding portions of the hooks. With the inductive heating device having the aforementioned structure in the nineteen aspect, it is possible to eliminate the risk of disengagement between the heat dissipation plate and the coil unit due to vibrations and the like during shipments. Further, as the fixing member, it is possible to employ a generally-used fixing means, such as a fixing screw, a pin, an adhesive agent.

In a twentieth aspect of the present invention, in the inductive heating device having the structure in any of the aforementioned first to fifth aspects, the heat dissipation plate on which the coil unit is placed is adapted to define only an area thereunder in the vertical direction as a cooling space for passing, therethrough, cooling air from a blower, such that cooling air from the blower directly cools the heat dissipation plate only at its lower surface in the vertical direction, together with heat generating components in a control device placed in the cooling space, and heat from the heating coil is cooled through the heat dissipation plate. With the inductive heating device having the aforementioned structure in the twentieth aspect, it is possible to eliminate the necessity of forming, inside the coil unit, a cooling space for directly cooling the heating coil, which enables reduction of the thickness and the space of the coil unit. This enables provision of an inductive heating device having a reduced size and being capable of energy saving.

Advantageous Effects of the Invention

With the present invention, it is possible to realize an inductive heating device having a structure for certainly diffusing heat from induction heating coils to ferrites and a coil base for efficiently cooling them through a heat dissipation plate, further having a structure for increasing an electrical insulating property for the heating coils and, further, having a reduced thickness and a reduced space therein.

DETAILED DESCRIPTION OF THE PREFERRED EMBODIMENTS

Hereinafter, with reference to the accompanying drawings, there will be described induction heating cookers as embodiments of an inductive heating device according to the present invention. Further, the inductive heating device according to the present invention is not limited to the structures of the induction heating cookers which will be described in the following embodiments and is intended to include inductive heating devices structured based on technical concepts equivalent to the technical concepts which will be described in the following embodiments and based on technical common senses in the present technical field.

First Embodiment

Figure 1:
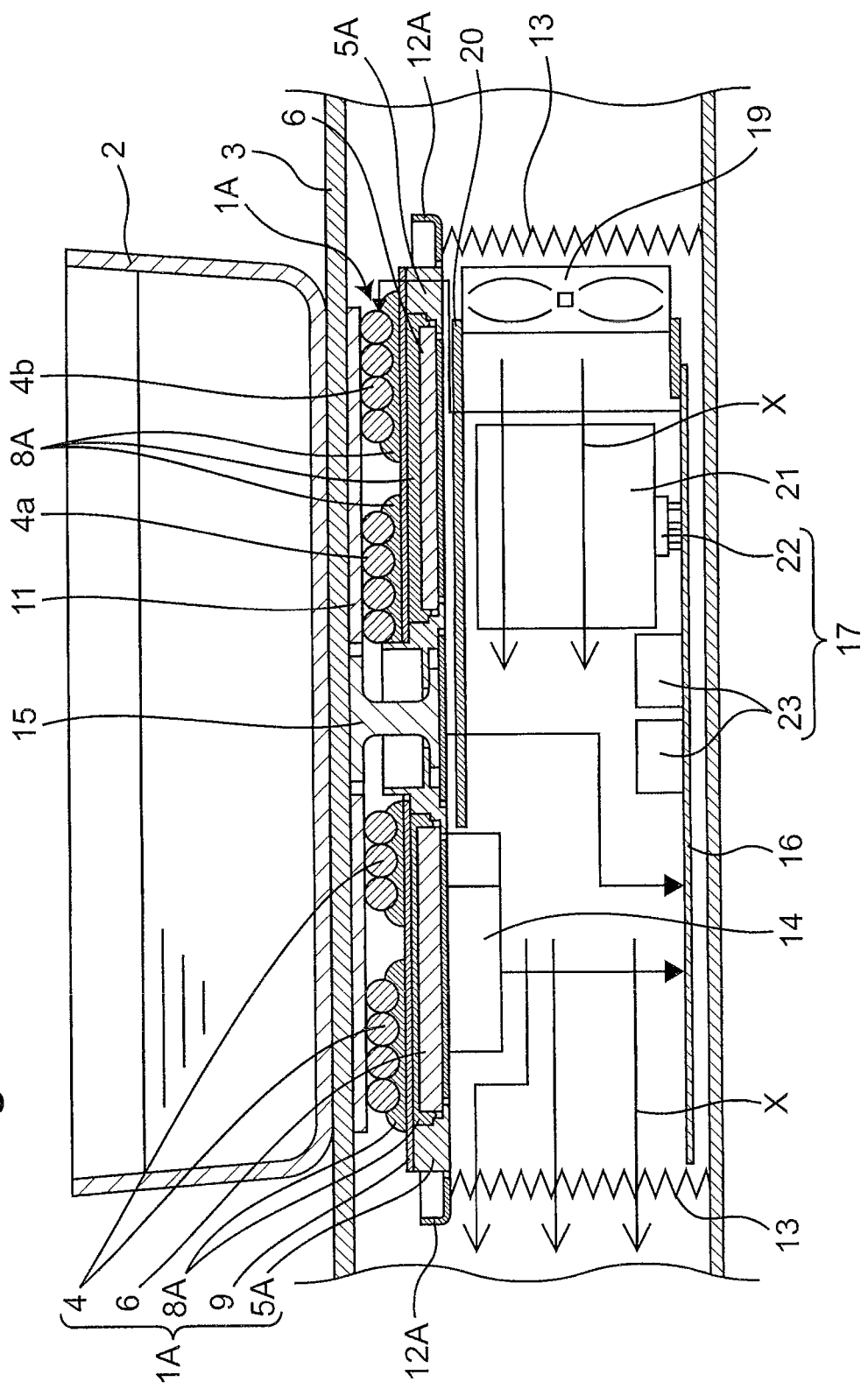
FIG. 1 is a cross-sectional view illustrating the structure of an induction heating cooker as an inductive heating device according to a first embodiment of the present invention.
Figure 2:
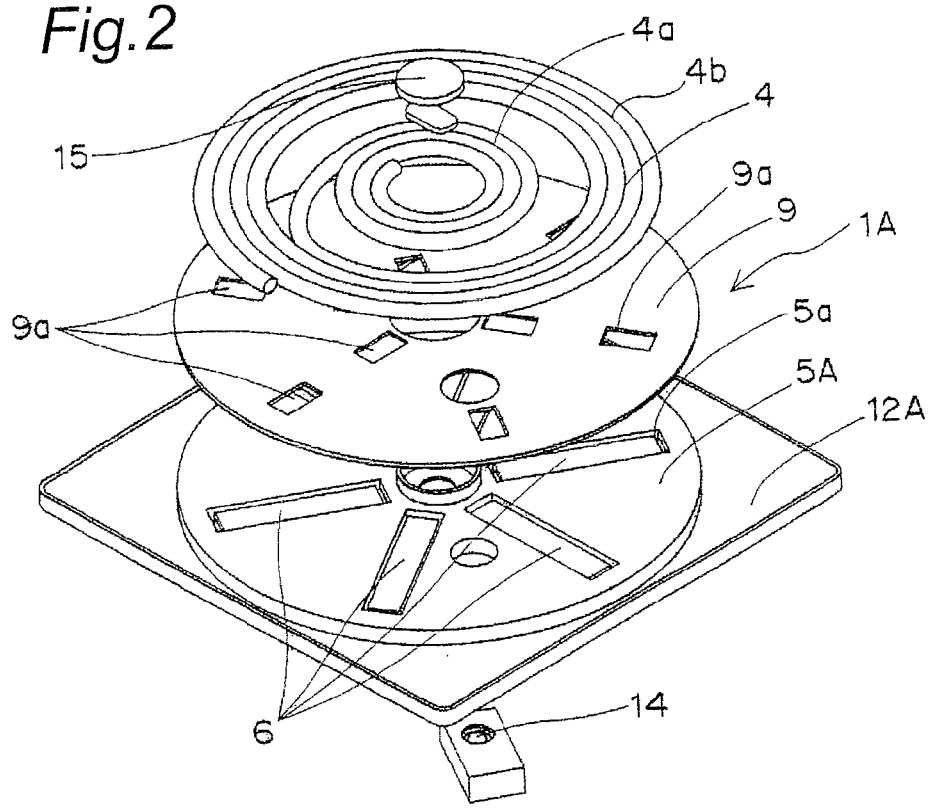
FIG. 2 is an exploded perspective view illustrating the structure of a coil unit in the induction heating cooker according to the first embodiment.
Figure 3:
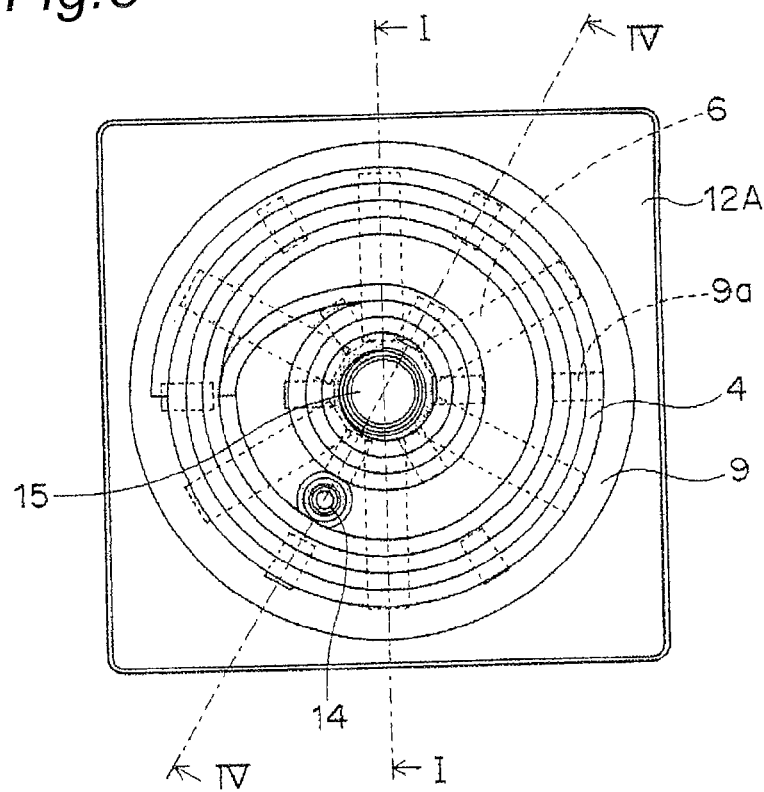
FIG. 3 is a plan view of the coil unit in the induction heating cooker according to the first embodiment.
Figure 4:
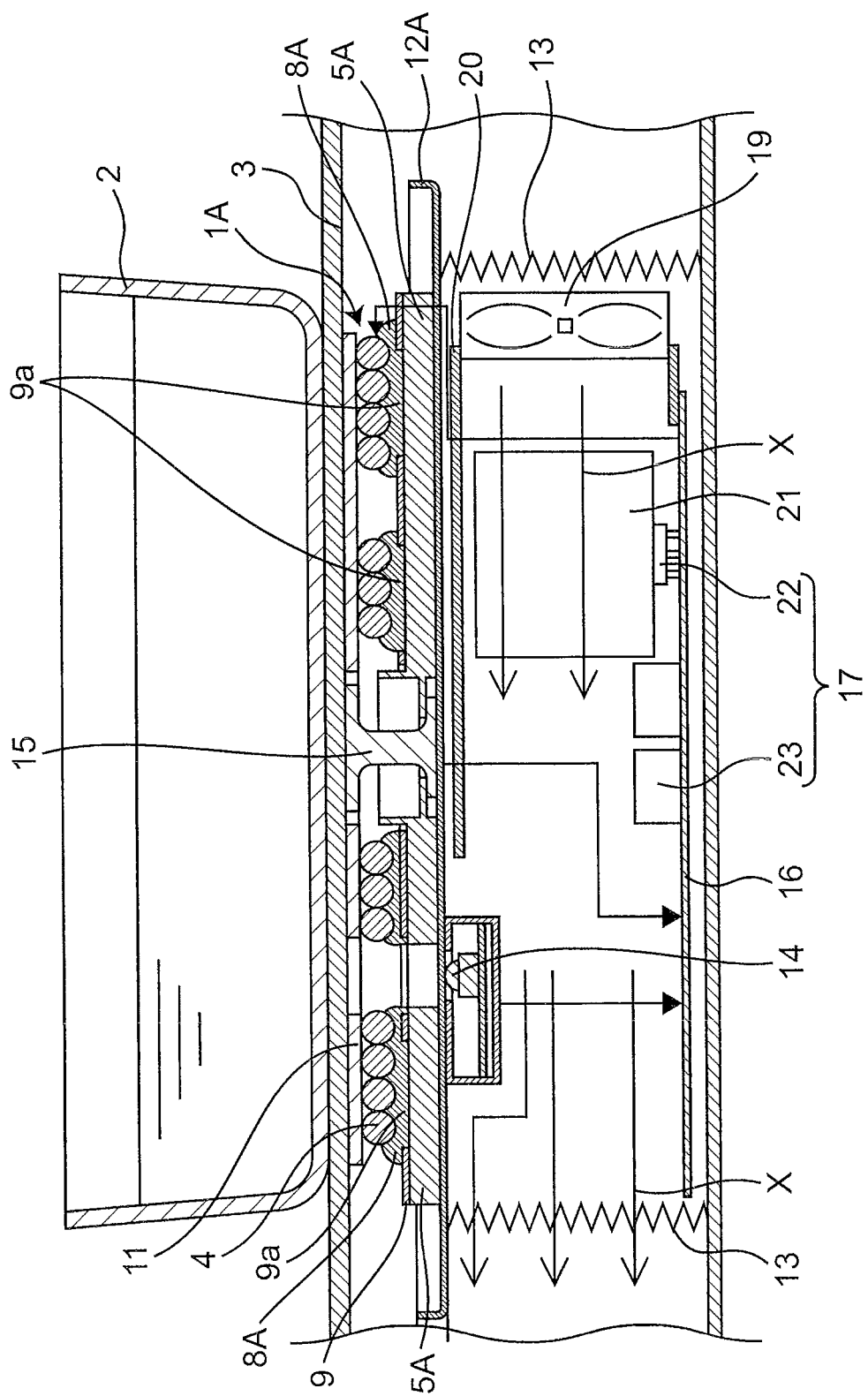
FIG. 4 is a cross-sectional view illustrating the structure of the induction heating cooker according to the first embodiment.

FIG. 1 is a cross-sectional view illustrating the structure of an induction heating cooker as an inductive heating device according to a first embodiment of the present invention. FIG. 2 is an exploded perspective view illustrating the structure of a coil unit in the induction heating cooker according to the first embodiment. FIG. 3 is a plan view of the coil unit illustrated in FIG. 2. FIG. 4 is a cross-sectional view illustrating the structure of the induction heating cooker according to the first embodiment, illustrating a cross section of the coil unit in FIG. 3, taken along the position designated by the line VI-VI. Further, FIG. 1 is a cross-sectional view taken along the position on the coil unit which is designated by the line I-I in FIG. 3. These respective views are schematically drawn for ease of understanding of the present invention and are not intended to indicate actual sizes and shapes.

As illustrated in FIG. 1, in the induction heating cooker according to the first embodiment of the present invention, there is provided a top plate 3 for placing, thereon, a cooking container and the like, as a to-be-heated object 2, on an upper surface of a main body forming the outer contour. The top plate 3 is made of a heat-resistant glass, such as a crystallized glass, and there is placed a coil unit 1A just under the top plate 3 with a heat insulation portion 11 interposed therebetween. The coil unit 1A includes a heating coil 4 as an induction heating coil for inductively heating the to-be-heated object 2. In the first embodiment, the heating coil 4 is constituted by an inner coil 4a and an outer coil 4b which are connected in series to each other.

FIG. 2 is an exploded view illustrating the structure of the coil unit 1A in the induction heating cooker according to the first embodiment. In FIG. 1 and FIG. 2, the upward and downward directions indicate the vertical direction. Further, in the following respective embodiments, upper and lower positions which will be used for the description will indicate upper and lower positions in the vertical direction.

As illustrated in FIG. 2, under the heating coil 4, there is placed a coil base 5A made of a resin material, such that a mica plate 9 formed from a sheet-plate-shaped mica material, as an electrical insulating member, is interposed therebetween. The coil base 5A is provided with plural housing holes 5a with a rectangular shape which are placed radially and penetrate therethrough. Each housing hole 5a houses a ferrite 6 having a substantially-rectangular parallelepiped shape and having a magnetic-flux concentrating property. Since the ferrites 6 are housed in the radial housing holes 5a in the coil base 5A, it is possible to restrain downward magnetic fluxes from the coil base 5A. The housing holes 5a formed in the coil base 5A conform to the substantially-rectangular parallelepiped shape of the ferrites 6 housed therein and, thus, are formed to have such a shape that the ferrites 6 are certainly housed within the housing holes 5a with substantially-no gap induced therebetween. Further, each housing hole 5a is provided, at its lower edge, with positioning protrusions 5b (see FIG. 6 which will be described later) for positioning the ferrite 6 housed therein. The coil base 5A is formed such that its lower surface is a substantially-flat surface, and the aforementioned positioning protrusions 5b are formed such that the lower surface of the coil base 5A is flushed with the lower surfaces of the ferrites 6 housed in the housing holes 5a.

The induction heating cooker according to the first embodiment will be described, with respect to an example where the positioning protrusions 5b are provided at two positions in the inner periphery side and the outer periphery side of the lower edge of each housing hole 5a. However, in the present invention, the positioning protrusions are required only to be formed in such a way as to prevent the ferrites 6 from disengaging from the housing holes 5a, such that the lower surfaces of the ferrites 6 and the lower surface of the coil base 5A are certainly flushed with each other. Thus, the coil base 5A and the ferrites 6 are placed such that their lower surfaces are flushed with each other, and the coil base 5A and the ferrites 6 are secured to each other through an adhesive agent 8A, so that the lower surface of the coil base 5A and the lower surfaces of the ferrites 6 are certainly held flushed with each other.

As described above, between the heating coil 4 and the coil base 5A, there is placed the sheet-plate-shaped mica plate 9, as an electrical insulating member. Therefore, the mica plate 9 is placed such that it is sandwiched between the heating coil 4 and the ferrites 6 housed in the housing holes 5a in the coil base 5A. On the opposite surfaces of the mica plate 9 in its area facing the heating coil 4, an adhesive agent 8A, which also serves as a heat conductive member, is provided. Thus, the heating coil 4 and the mica plate 9 are adhered to each other, the mica plate 9 and the ferrites 6 are adhered to each other, and the mica plate 9 and the coil base 5A are adhered to each other, and they are thermally coupled to each other. The adhesive agent 8A employed in the first embodiment is a silicon-based natural-curing type adhesive agent and, also, is an adhesive agent having both thermal conductivity and heat resistance.

As described above, in the induction heating cooker according to the first embodiment, the adhesive agent 8A is embedded between the heating coil 4 and the mica plate 9, so that they are coupled to each other. Therefore, convexities and concavities formed by the wires constituting the heating coil 4, and variations of the thicknesswise sizes of the ferrites 6 are absorbed by the adhesive agent 8A used therein. As described above, the heating coil 4, the mica plate 9, the ferrites 6 and the coil base 5A are secured to each other through the adhesive agent 8A, so that the coil unit 1A is integrated. In the integrated coil unit 1A, the respective lower surfaces of the coil base 5A and the ferrites 6 are held flushed with each other.

Further, as the adhesive agent 8A used for coupling the coil base 5A and the ferrites 6 to each other, it is preferable to employ the same one as the adhesive agent 8A having a heat conduction function of coupling the heating coil 4 and the mica plate 9 to each other, coupling the mica plate 9 and the ferrites 6 to each other and, further, coupling the mica plate 9 and the coil base 5A to each other, in such a way as to allow heat conduction therebetween. In adhering the mica plate 9 and the ferrites 6 to each other, by adjusting the amount of the adhesive agent 8A provided on the mica plate 9 and the position on the mica plate 9 on which the adhesive agent 8A is provided, it is possible to adhere both the ferrite 6 and the coil base 5A thereto at the same time. By employing this method for assembling the coil unit 1A, it is possible to facilitate the assembling and to reduce the number of working processes, thereby largely improving the assemblability (the workability).

As illustrated in FIG. 2 and FIG. 3, the mica plate 9 is provided with plural coupling holes 9a (through holes) to be filled with the adhesive agent 8A, at portions of its area faced to both the heating coil 4 and the coil base 5A, namely its area which is not faced to the ferrites 6. In the assembled coil unit 1A, the coupling holes 9a are filled with the adhesive agent 8A, which realizes a state where the heating coil 4 is directly adhered and secured to the coil base 5A through the coupling holes 9a.

Figure 5:
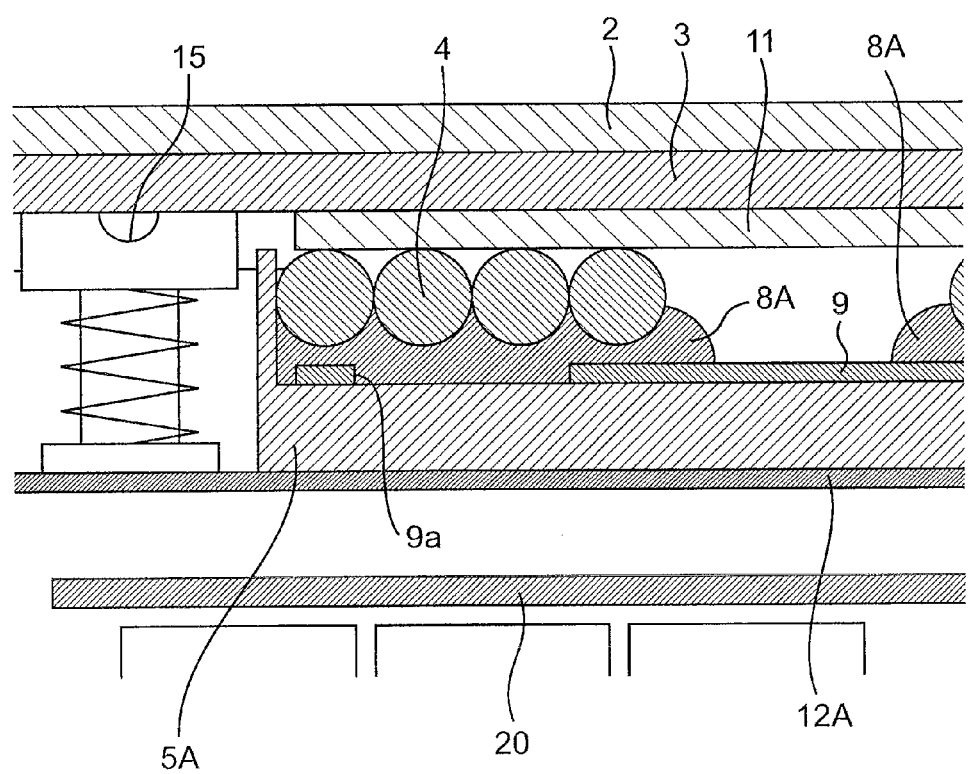
FIG. 5 is a cross-sectional view illustrating the structure of the induction heating cooker according to the first embodiment, in a state where a heating coil and a coil base are secured to each other through an adhesive agent, with a mica plate interposed therebetween.

FIG. 5 is an enlarged cross-sectional view illustrating the heating coil 4 and the coil base 5A which are secured to each other through the adhesive agent 8A charged in the coupling holes 9a in the mica plate 9, in a state where they are thermally coupled to each other in such a way as to allow heat conduction therebetween. Further, in FIG. 5, the heating coil 4 is schematically illustrated, and the actual shape of the heating coil 4 is not illustrated.

As described above, in the coil unit 1A according to the first embodiment, the heating coil 4 and the coil base 5A are integrated with each other, such that the mica, plate 9 which is prone to exfoliation and has a relatively-lower mechanical strength is interposed therebetween. However, the heating coil 4 and the coil base 5A are directly secured to each other and, also, the coil base 5A and the ferrites 6 are directly secured to each other, so that the coil unit 1A constituted by the heating coil 4, the mica plate 9, the ferrites 9 and the coil base 5A is entirely secured and integrated through the adhesive agent 8A. Accordingly, the coil unit 1A according to the first embodiment is adapted to thermally couple the components to each other, in such a way as to induce no vacancy thereamong for allowing conduction of heat from the heating coil 4 with higher efficiency and, further, is adapted to have an improved mechanical strength and, thus, has largely-improved vibration-resistant performance and drop-impact resistant performance against vibrations, drops and the like during shipments.

The induction heating cooker according to the first embodiment employs the sheet-plate-shaped mica plate 9 as an electrical insulating member, which enables reducing the distance between the heating coil 4 and the ferrites 6, while maintaining a state where the heating coil 4 and the ferrites 6 are electrically insulated from each other. Further, since the mica plate 9 having a higher electrical insulating property is inserted between the heating coil 4 and the ferrites 6, there is no need for selecting a resin material with excellent electrical insulating performance as the material of the coil base 5A, thereby offering the advantage that a resin material to form the coil base 5A can be selected, out of a wider range.

As described above, the induction heating cooker according to the first embodiment employs the mica plate 9 as an electrical insulating member, which enables reducing the thickness of the entire coil unit 1A and, also, enables maintaining the electrically-insulating state in the event of abnormal heat generation from the heating coil 4.

Further, in the induction heating cooker according to the first embodiment, between the heating coil 4 in the coil unit 1A and the top plate 3 for placing the to-be-heated object 2 thereon, there is provided the heat insulation portion 11 (see FIG. 1) which is made of a ceramic fiber and the like, in order to inhibit the heating coil 4 from being influenced by heat transmitted thereto from the to-be-heated object 2 having been heated.

In the induction heating cooker according to the first embodiment, the coil unit 1A having an integrated structure as described above is directly placed on a heat dissipation plate 12A made of a metal material with high heat conduction performance, such as aluminum (see FIG. 1). In the induction heating cooker according to the first embodiment, the coil unit 1A is structured such that the lower surface of the coil unit 1A is formed from the lower surfaces of both the coil base 5A and the ferrites 6 which are flushed with each other. Further, the coil unit 1A having the coil base 5A and the ferrites 6 which are flushed with each other at their lower surfaces is placed on the heat dissipation plate 12A. Accordingly, the heat dissipation plate 12A for placing the coil unit 1A thereon has a flat surface larger than the vertically-projected area of the heating coil 4 held in the coil unit 1A, wherein this flat surface is larger than the vertically-projected area of the coil unit 1A, as a matter of course.

Figure 6:
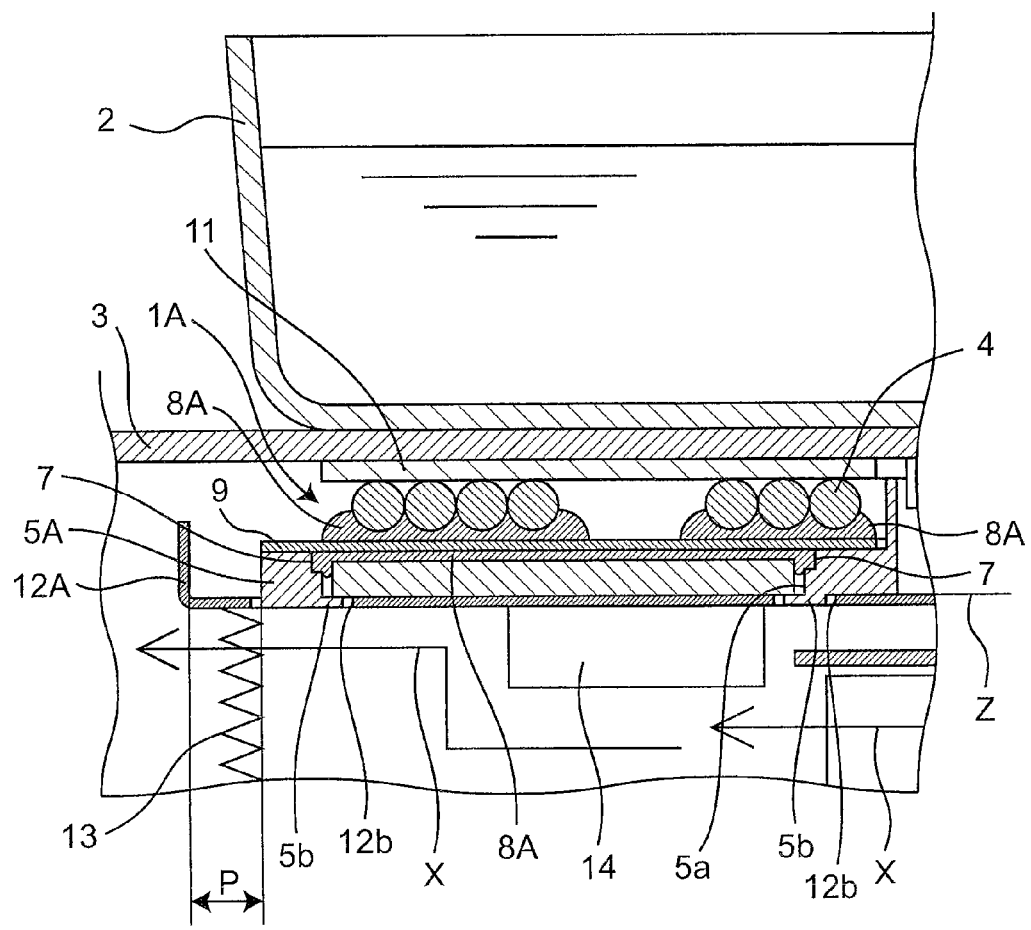
FIG. 6 is a cross-sectional view illustrating, in an enlarging manner, a portion of the coil unit placed on a heat dissipation plate, in the induction heating cooker according to the first embodiment.

FIG. 6 is a cross-sectional view illustrating, in an enlarging manner, a portion of the coil unit 1A placed on the heat dissipation plate 12A in the induction heating cooker according to the first embodiment. As illustrated in FIG. 6, both the lower surface of the coil base 5A (the surface designated by a reference character Z in FIG. 6) and the lower surfaces of the ferrites 6 are certainly in contact with the upper surface of the heat dissipation plate 12A, which is the flat surface thereof, and, further, the flat surface of the heat dissipation plate 12A is protruded outwardly from the outer peripheral portion of the coil base 5A. Referring to FIG. 6, the distance designated by a reference character P is the distance by which the flat surface of the heat dissipation plate 12A protrudes horizontally from the outer peripheral portion of the coil base 5A.

As described above, each housing hole 5a formed in the coil base 5A is provided with the positioning protrusions 5b (see FIG. 6) at two positions in the inner periphery side and the outer periphery side of its lower edge portion. Due to the provision of the positioning protrusions 5b as described above, the housing holes 5a are structured such that the ferrites 6 housed within the housing holes 5a are certainly flushed, at their lower surfaces, with the lower surface of the coil base 5A. The heat dissipation plate 12A is provided with holes 12b at its portions facing the positioning protrusions 5b of the coil base 5A, which prevents the positioning protrusions 5b from coming into contact with the heat dissipation plate 12A.

In order to certainly couple the ferrites 6 housed in the housing holes 5a in the coil base 5A, the coil base 5A and the mica plate 9 to each other through the adhesive agent 8A as described above, the housing holes 5a in the coil base 5A are provided, at their upper edge portions, with concave portions (level differences) which form adhesion portions 7 to be filled with the adhesive agent 8A. Due to the formation of the adhesion portions 7 to be filled with the adhesive agent 8A at the upper edge portions of the housing holes 5a as described above, the ferrites 6, the coil base 5A and the mica plate 9 are certainly adhered to each other and, thus, are in a state where they are thermally coupled to each other for allowing heat conduction therebetween.

As described above, the upper surface of the heat dissipation plate 12A, which is the flat surface thereof, is formed to be larger than the outer diameter size of the heating coil 4 and, further, larger than the outer diameter size of the coil unit 1A. In this case, in the state where the coil unit 1A holding the heating coil 4 is placed on the heat dissipation plate 12A, the flat surface of the heat dissipation plate 12A is exposed, outside the outermost coil in the heating coil 4. Namely, the heat dissipation plate 12A is formed such that its flat surface is larger than the vertically-projected area of the heating coil 4. Therefore, due to effects of the magnetic field generated from the heating coil 4 being excited, an electric current circulating therearound (a circulating electric current) is induced in the outer peripheral portion of the heat dissipation plate 12A outside the heating coil 4. The circulating electric current outside the heating coil 4 excites a magnetic field which acts in the opposite direction from that of the magnetic field generated from the heating coil 4, thereby offering an effect of reducing the magnetic field leaking from the induction heating cooker to the outside.

In the induction heating cooker according to the first embodiment, between the bottom portion of the main body of the induction heating cooker and the heat dissipation plate 12A on which the coil unit 1A is placed, there is provided a spring 13 as an elastic member, and the heat dissipation plate 12A is biased upwardly by the spring 13. As result thereof, the heating coil 4 in the coil unit 1A is pushed toward the lower surface of the top plate 3, and the heating coil 4 is pressed against the top plate 3 with the heat insulation portion 11 interposed therebetween.

Although the heat dissipation plate 12A is pushed upwardly by the biasing force of the spring 13 as described above, the distance between the heating coil 4 and the top plate 3 is maintained at a predetermined size, due to a spacer (not illustrated) provided on the coil base 5A.

Further, in the induction heating cooker according to the first embodiment, there is provided an infrared sensor 14. The infrared sensor 14 is placed at a position under the top plate 3 which faces the bottom surface of the to-be-heated object 2 placed at a predetermined position on the top plate 3. The infrared sensor 14 is adapted to detect, through the top plate 3, infrared rays radiated from the bottom surface of the to-be-heated object 2 and is adapted to output signals corresponding to the detected temperature. Further, the infrared sensor 14 detects the temperature of the bottom surface of the to-be-heated object 2 in an area at a decentered position deviated from the center portion thereof. Thus, the infrared sensor 14 is adapted to perform detection in an area which is heated to a highest temperature, out of the bottom surface of the to-be-heated object 2, which is a cooking container or the like.

Further, in the induction heating cooker according to the first embodiment, there is provided a thermistor 15. The thermistor 15 is placed at a position faced to a center of the bottom surface of the to-be-heated object 2, such as a cooking container, which is placed at a predetermined position on the top plate 3 and, further, the thermistor 15 is adapted to be pressed against the back surface of the top plate 3. The thermistor 15 outputs, to a control circuit 16, signals corresponding to the temperature of the top plate 3 opposing to the bottom surface of the to-be-heated object 2.

As illustrated in FIG. 1, the control circuit 16 is placed in a space under the coil unit 1A and is provided on a control board placed at a position near the infrared sensor 14 and the thermistor 15. The control circuit 16 is adapted to control the output of the heating coil 4, based on signals outputted from the infrared sensor 14 and the thermistor 15.

In the induction heating cooker according to the first embodiment, there is provided a blower 19 which creates cooling air X for cooling heat generating components 17 in the control circuit 16 (a switching device 22 (IGBT) coupled to a heat sink 21, resonant capacitors 23 and the like). Further, there is provided a duct 20 for directing the cooling air X from the blower 19 to the heat generating components 17. Further, the infrared sensor 14 is placed on the lower side of the heat dissipation plate 12A and is placed near the outlet of the guide 20 for guiding the cooling air X from the blower 19 (see FIG. 4).

In the induction heating cooker according to the first embodiment, the infrared sensor 14 and the control circuit 16 are placed under the ferrites 6 in the coil unit 1A and, therefore, the magnetic shielding effect of the ferrites 6 alleviates the influence of magnetic fluxes from the heating coil 4 on the infrared sensor 14 and the control circuit 16. Further, in order to eliminate the influence of magnetic flux leaks, the heat dissipation plate 12A having a flat surface larger than the projected area of the heating coil 4 is placed on the lower side of the coil base 5A housing and holding the ferrites 6.

In the induction heating cooker according to the first embodiment, as illustrated in FIG. 1, the heat dissipation plate 12A having an area larger than the vertically-projected area of the coil unit 1A is placed in such a way as to separate a heating space in which the heating coil 4 held by the coil unit 1A is placed, from a cooling space in which the duct 20, the infrared sensor 14, the control circuit 16 and the like are placed, and cooling air is flowed. Accordingly, the heat dissipation plate 12A certainly alleviates the influence of magnetic fluxes from the heating coil 4 in the heating space, on the respective components in the cooling space, and heat from the heating space is transmitted to the heat dissipation plate 12A and, further, is cooled in the cooling space.

Further, the infrared sensor 14, and the heat generating components 17 in the control circuit 16, such as the resonant capacitors 23 and the switching device 22 (IGBT) coupled to the heat sink 21 placed inside the duct 20, are cooled to a desired temperature, by the cooling air X from the blower 19 within the cooling space. Further, the cooling air X having cooled the heat generating components 17 comes into contact with the back surface of the heat dissipation plate 12A to cool the heat dissipation plate 12A and, thereafter, is discharged to the outside of the device.

Next, there will be described effects of the induction heating cooker having the aforementioned structure according to the first embodiment. As described above, in the induction heating cooker according to the first embodiment, the respective lower surfaces of the coil base 5A and the ferrites 6, which form the bottom surface of the integrated coil unit 1A, are flushed with each other, and the coil unit 1A is thermally coupled, at its substantially entire bottom surface, to the heat dissipation plate 12A. Further, the heat dissipation plate 12A is provided with the holes 12b at its portions facing the positioning protrusions 5b for positioning the ferrites 6 and is adapted such that the positioning protrusions 5b are placed in the holes 12b. Therefore, the heat dissipation plate 12A certainly in contact, at its flat surface, with the entire bottom surface of the coil unit 1A, thereby allowing heat conduction therebetween with higher efficiency.

Further, in the induction heating cooker according to the first embodiment, variations of the thicknesswise size of the ferrites 6, and convexities and concavities formed by the wires in the heating coil 4 are absorbed by the adhesive agent 8A embedded in the area facing the ferrites 6 and in the area facing the heating coil 4. Accordingly, the heating coil 4 and the ferrites 6 are thermally coupled to each other, and the heating coil 4 and the coil base 5A are thermally coupled to each other, with the mica plate 9 sandwiched therebetween, in such a way as to allow heat conduction therebetween with higher efficiency. As described above, between the heating coil 4 and the ferrites 6, there are provided the mica plate 9 as an electrical insulating member and the adhesive agent 8A as a heat conductive member, which certainly eliminates vacancies (air layers) with poor thermal conductivity, thereby ensuring heat conduction from the heating coil 4 to the ferrites 6. As a result thereof, in the induction heating cooker according to the first embodiment, heat generated from the heating coil 4 is certainly transmitted to the heat dissipation plate 12A through the ferrites 6 and the coil base 5A, thereby certainly lowering the temperature of the surface of the heating coil 4.

The induction heating cooker according to the first embodiment is adapted to utilize cooling air intended to cool the heat generating components 17 in the control circuit 16, for further cooling the heat dissipation plate 12A along therewith, thereby efficiently lowering the temperature of the surface of the heating coil 4. Namely, with the induction heating cooker according to the first embodiment, there is no need for forming, inside the coil base 5A, an air-blowing path for passing, therethrough, cooling air for directly cooling the heating coil 4, and there is provided a structure for indirectly and effectively cooling the heating coil 4 with the blower 19 for cooling the control circuit 16. This enables reducing the quantity of cooling air within the entire device, thereby realizing an induction heating cooker having a cooling structure with higher efficiency.

Further, in the induction heating cooker according to the first embodiment, the air-blowing path for cooling air (the cooling space) is at a position spaced apart from the top plate 3 and in a lower portion of the device under the heat dissipation plate 12A on which the coil unit 1A is placed thereon, which realizes a structure which inhibits noises generated from the air-blowing path from reaching users, thereby realizing a low-noise induction heating cooker.

Further, the induction heating cooker according to the first embodiment can be formed with the small-sized and small air-quantity blower 19 and, further, is not required to be structured for preventing the cooling air from directly coming into contact with the heating coil 4, which enables separating the heating space and the cooling space from each other through the heat dissipation plate 12A in the upward and downward directions, thereby enabling effective utilization of the space inside the device and reduction of the space therein. As a result thereof, the induction heating cooker according to the first embodiment can have a reduced size and a reduced thickness.

In the induction heating cooker according to the first embodiment, the infrared sensor 14 is placed on the lower side of the heat dissipation plate 12A and is placed near the outlet of the guide 20 for guiding the cooling air. In general, the infrared sensor is influenced by heat in terms of the detection performance and, therefore, it is important to thermally protect the infrared sensor. In the first embodiment, heat induced from the heating coil 4 is efficiently transmitted to the heat dissipation plate 12A and is cooled thereby, which can realize improved cooling performance for the heating coil 4. As described above, the heating coil 4 is reduced in temperature due to the heat dissipation effect of the heat dissipation plate 12A and, also, the infrared sensor 14 is placed in the cooling space under the heat dissipation plate 12A, which largely inhibits the infrared sensor 14 from being influenced by heat from the heating coil 4. As a result thereof, in the induction heating cooker according to the first embodiment, the infrared sensor 14 has largely-improved detection performance, thereby enabling accurate control.

The induction heating cooker according to the first embodiment is structured to place the coil unit 1A having the coil base 5A and the ferrites 6 which are flushed with each other at their lower surfaces, on the heat dissipation plate 12A as a heat dissipation means, rather than being structured to hold a heat dissipation means inside the coil unit. Further, heat from the coil unit 1A is certainly transmitted to the heat dissipation plate 12A having a larger heat dissipation surface and is cooled thereby. Accordingly, in the first embodiment, there is no need for providing the coil unit 1A with a specific mechanism for holding the heat dissipation means, which enables reduction of the thickness of the coil unit 1A, thereby attaining reduction of the space within the entire device.

As described above, the induction heating cooker according to the first embodiment includes the coil unit 1A constituted by the heating coil 4 for heating the to-be-heated object 2, the plural ferrites 6 placed under the heating coil 4, and the coil base 5A placed under the heating coil 4 and, further, includes the heat dissipation plate 12A on which the coil unit 1A is directly placed. In this structure, the entire coil unit 1A is thermally coupled to the heat dissipation plate 12A. Further, the heating coil 4 and the ferrites 6, the heating coil 4 and the coil base 5A, and the coil base 5A and the ferrites 6 are certainly and thermally coupled to each other, through the adhesive agent 8A having the function of the heat conductive member, thereby allowing heat conduction from the heating coil 4 to the heat dissipation plate 12A through the ferrites 6 and the coil base 5A. As a result thereof, with the induction heating cooker according to the first embodiment, it is possible to efficiently lower the temperature of the surface of the heating coil 4, thereby enabling reduction of the thickness of the entire coil unit 1A and reduction of the space therein.

Further, while the induction heating cooker according to the first embodiment has been described with respect to an example where the adhesive agent 8A is employed as means for securing the coil base 5A and the ferrites 6 to each other, the present invention is not intended to be restricted to this example. As means for securing the ferrites 6 thereto, it is also possible to employ a structure which provides the housing holes for housing the ferrites 6 which are foamed in the coil base 5A with narrow ribs having elasticity, in their inner sides, such that the ferrites 6 are press-fitted in these housing holes, a structure for pressing the ferrites 6 with claws with elasticity for mechanically securing them, a structure for securing the ferrites 6 and the coil base 5A to each other with adhesive tapes for integrating them, and the like.

Further, while the induction heating cooker according to the first embodiment has been described with respect to an example where the adhesive agent 8A is employed as a heat conductive member between the heating coil 4 and the ferrites 6, between the heating coil 4 and the coil base 5A, and between the coil base 5A and the ferrites 6, it is also possible to employ a grease, a silicon elastic member and the like which have thermal conductivity, as the heat conductive member. Namely, the heat conductive member is required only to be made of a flexible heat conductive material capable of absorbing convexities and concavities induced by the wires in the heating coil 4, and variations of the thicknesswise size of the ferrites 6, and it goes without saying that the heat conductive member is more preferably made of a material with higher thermal conductivity.

Further, while the induction heating cooker according to the first embodiment has been described with respect to an example where the coil base 5A and the ferrites 6 are formed such that their lower surfaces are flushed with each other, and the coil unit 1A including the coil base 5A and the ferrites 6 is directly in contact with the heat dissipation plate 12A to be integrated therewith, the present invention is not limited to this structure. For example, it is also possible to further provide a thermally-conductive grease, a silicon sheet with excellent thermal conductivity or the like, between the coil unit 1A and the heat dissipation plate 12A, which enables transmitting heat induced from the heating coil 4 to the heat dissipation plate 12A more efficiently, thereby realizing a structure capable of further lowering the temperature of the heating coil 4.

While the induction heating cooker according to the first embodiment has been described with respect to a structure for cooling the heat generating components 17 with cooling air from the blower 19 and, thereafter, cooling the heat dissipation plate 12A, the present invention is not intended to be restricted to this structure. In the present invention, it is also possible to provide a structure which causes cooling air from the blower 19 to cool the heat dissipation plate 12A at first and, thereafter, cool the heat generating components 17, or a structure which divides, with ducts, an air-blowing path for flowing cooling air therethrough into plural parts such that the heat generating components 17 and the heat dissipation plate 12A which are placed in parallel are directly cooled by the cooling air from the respective separated ducts.

Further, while the induction heating cooker according to the first embodiment has been described with respect to the heating coil 4 constituted by the two coils which are the inner smaller coil (4a) and the outer larger coil (4b) which are connected to each other in series (see FIG. 2), the present invention is not intended to be restricted to this structure. The heating coil can be constituted by a single coil or can be also constituted by two coils connected in parallel with each other such that they can be individually controlled.

Further, while the induction heating cooker according to the first embodiment has been described with respect to an example where the sheet-plate-shaped mica plate 9 is employed as an electrical insulating member between the heating coil 4 and the ferrites 6, it is also possible to employ, thereas, a sheet-plate-shaped resin with heat resistance (such as a fluorocarbon resin).

Second Embodiment

Figure 7:
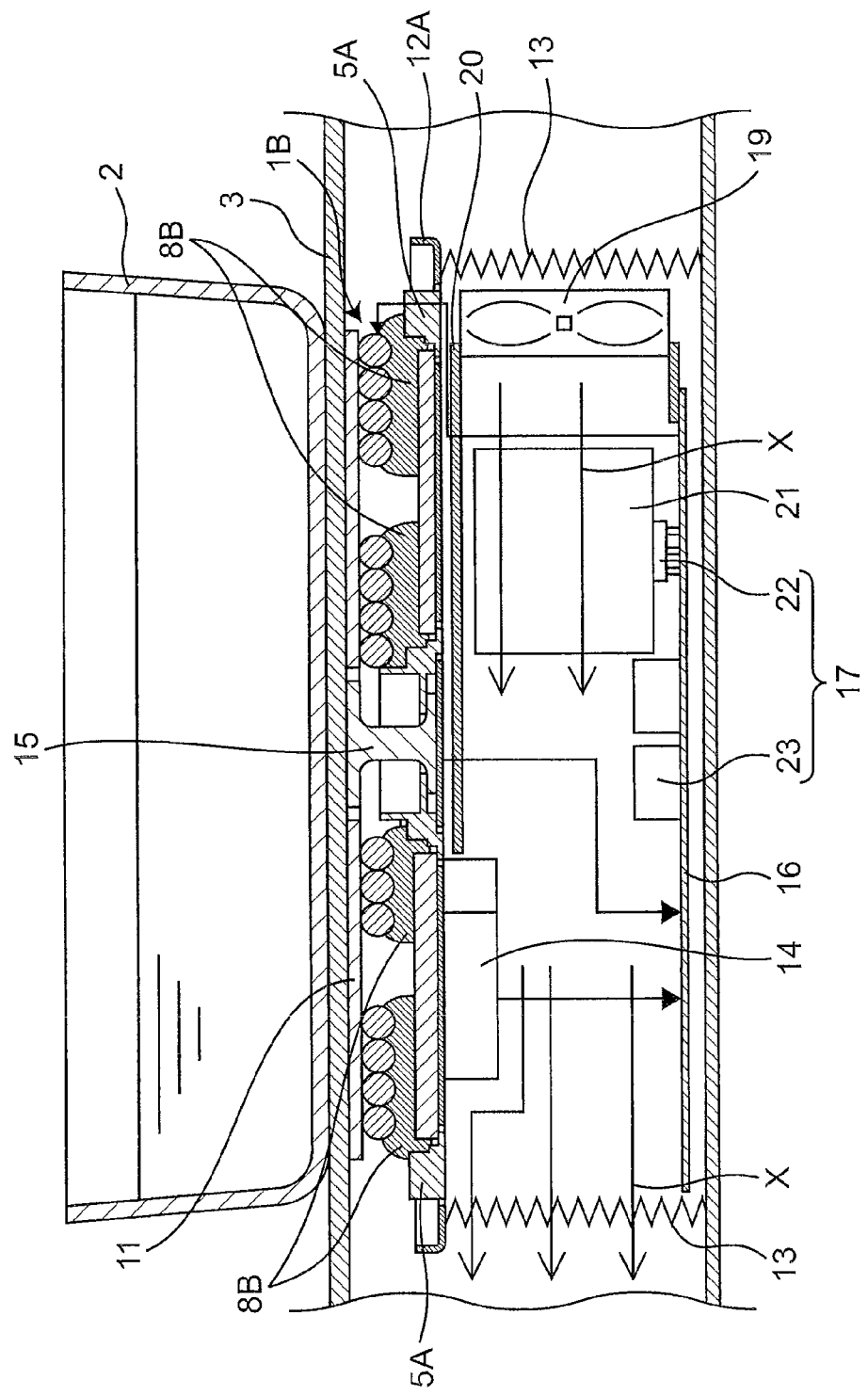
FIG. 7 is a cross-sectional view schematically illustrating the structure of an induction heating cooker according to a second embodiment of the present invention.

Next, there will be described an induction heating cooker according to a second embodiment of the present invention, with reference to FIG. 7. FIG. 7 is a cross-sectional view schematically illustrating the structure of the induction heating cooker according to the second embodiment.

The induction heating cooker according to the second embodiment is different from the induction heating cooker according to the aforementioned first embodiment, in that there is provided no mica plate as an electrical insulating member, and an adhesive agent functions as both a heat conductive member and an electrical insulating member. Further, in the description of the second embodiment, elements having the same functions and structures as those of the first embodiment will be designated by the same reference characters, and description of these elements will be omitted by substituting the description in the first embodiment therefor.

As illustrated in FIG. 7, in the induction heating cooker according to the second embodiment, there is placed a coil unit 1B just under a top plate 3 for placing a to-be-heated object 2 thereon, with a heat insulation portion 11 interposed therebetween. The coil unit 1B includes a heating coil 4 for inductively heating the to-be-heated object 2.

As illustrated in FIG. 7, the heating coil 4 is adhered to a coil base 5A and ferrites 6, through an adhesive agent 8B. Accordingly, in the structure of the induction heating cooker according to the second embodiment, the ferrites 6 are housed within housing holes 5a formed in the coil base 5A, and the heating coil 4 is secured on the coil base 5A through the adhesive member 8B. Further, similarly to in the first embodiment, the housing holes 5a in the coil base 5 are provided with positioning protrusions 5b at their lower edges, so that the ferrites 6 housed in the housing holes 5a are certainly placed at predetermined positions. Due to the formation of the positioning protrusions 5b in the housing holes 5a, it is possible to certainly cause the ferrites 6 housed within the housing holes 5a to be flushed, at their lower surfaces, with the lower surface of the coil base 5A. In this state, the coil base 5A and the ferrites 6 are secured to each other.

As described above, in the coil unit 1B in the induction heating cooker according to the second embodiment, there is provided the adhesive agent 8B having both an electrical insulating property and thermal conductivity, as an electrical insulating member, and this adhesive agent 8B also functions as a heat conductive member. Accordingly, in the induction heating cooker according to the second embodiment, in cases where the coil base 5A holding the ferrites 6 is coupled to the heating coil 4, the adhesive agent 8B is embedded between at least the heating coil 4 and the ferrites 6, which prevents the heating coil 4 and the ferrites 6 from coming into direct contact with each other.

Next, there will be described effects of the induction heating cooker having the aforementioned structure according to the second embodiment. The induction heating cooker according to the second embodiment employs the adhesive agent 8B having an electrical insulating property as an electrical insulating member, and this adhesive agent 8B also functions as a heat conductive member. Accordingly, the induction heating cooker according to the second embodiment has a smaller number of components and a simple structure and, further, enables the distance between the heating coil 4 and the ferrites 6 to be made smaller, in a state where electrical insulation between the heating coil 4 and the ferrites 6 is secured. This enables reducing the thickness of the entire coil unit 1B. Further, the induction heating cooker according to the second embodiment has a structure capable of maintaining the electrical insulation, even in the event of abnormal heat generation from the heating coil 4.

In the induction heating cooker according to the second embodiment, a single member (the adhesive agent 8B) has an electrical insulating function, a heat conduction function and an adhesion function, and the heating coil 4 and the ferrites 6 are adhered to each other through this member (the adhesive agent 8B). Accordingly, the coil unit 1B according to the second embodiment is structured such that it can be easily and certainly integrated, thereby improving the assemblability of the induction heating cooker.

Further, the induction heating cooker according to the second embodiment utilizes the adhesive agent 8B having heat resistance, as a member having both an electrical insulating function and a heat conduction function, which enables certainly maintaining the electric insulation in the event of abnormal heat generation from the heating coil 4. This provides a cooker with excellent safety and reliability.

As described above, in the induction heating cooker according to the second embodiment, a member which functions as an electrical insulating member and a heat conductive member, such as the adhesive agent 8B, is embedded between the heating coil 4 and the ferrites 6, which allows the distance between the heating coil 4 and the ferrites 6 to be made smaller. As a result thereof, with the structure of the second embodiment, it is possible to reduce the thickness of the entire coil unit 1B and to reduce the space therein and, furthermore, it is possible to further improve the heat conduction to the heat dissipation plate 12A.

Further, in the induction heating cooker according to the second embodiment, the heating coil 4 and the ferrites 6 are adhered to each other with no other member (for example, an electrical insulating member such as a mica plate) interposed therebetween. This enables certainly and easily integrating the coil unit 1B with a smaller number of components and with a simple structure, thereby offering the effect of facilitating the assembling thereof. Further, the induction heating cooker according to the second embodiment employs a material with heat resistance, as a member for adhering the heating coil 4 and the ferrites 6 to each other (the adhesive agent 8B), which enables certainly maintaining the electric insulation in the event of abnormal heat generation from the heating coil 4. This provides a cooker with excellent safety.

Third Embodiment

Figure 8:
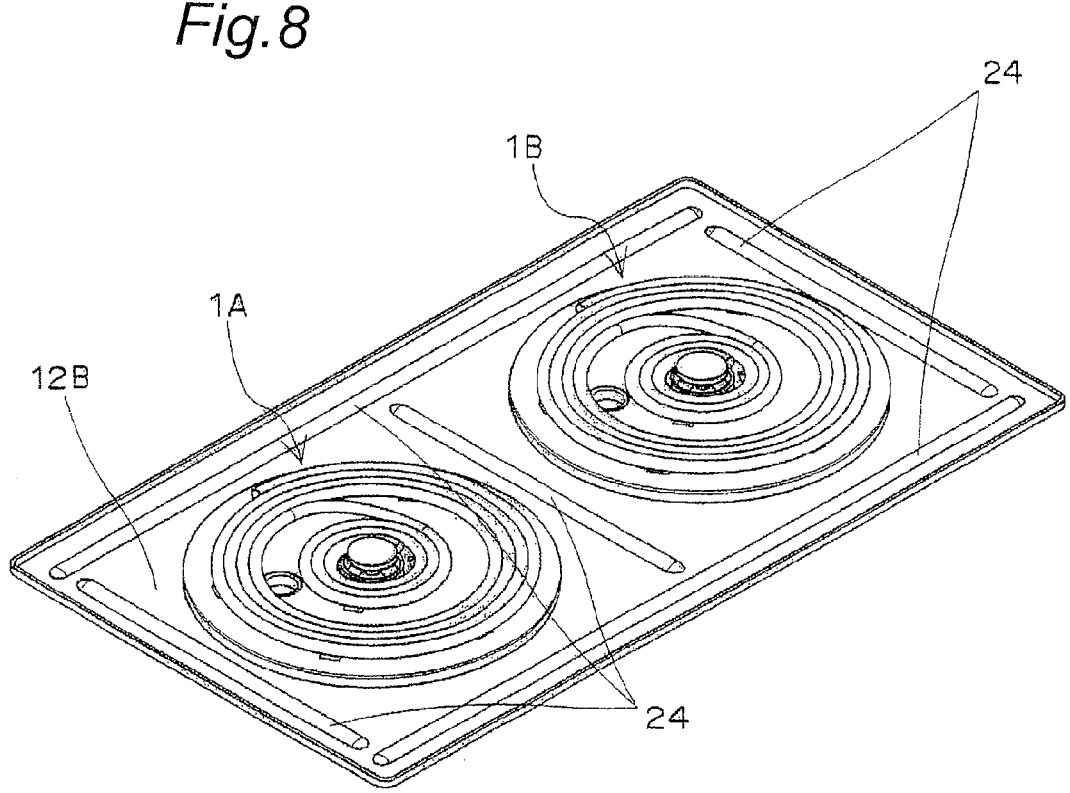
FIG. 8 is a perspective view illustrating an induction heating cooker according to a third embodiment of the present invention, wherein plural coil units are placed on a heat dissipation plate.

Next, there will be described an induction heating cooker according to a third embodiment of the present invention, with reference to the accompanying FIG. 8. FIG. 8 is a perspective view illustrating plural coil units placed on a heat dissipation plate, in the induction heating cooker according to the third embodiment. Further, in the description of the third embodiment, elements having the same functions and structures as those of the first embodiment will be designated by the same reference characters, and description of these elements will be omitted by substituting the description in the first embodiment therefor.

The induction heating cooker according to the third embodiment is different from the induction heating cooker according to the aforementioned first embodiment, in that the plural coil units are structured to be placed on the single heat dissipation plate, but the other structures are the same as those of the induction heating cooker according to the first embodiment.

As illustrated in FIG. 8, in the induction heating cooker according to the third embodiment, two coil units 1A and 1B are placed on and secured to a single heat dissipation plate 12B. Namely, the induction heating cooker according to the third embodiment is a cooker having two heating portions for use in induction heating cooking.

As described above, in the induction heating cooker according to the third embodiment, the two coil units 1A and 1B provided in association with the two heating portions are placed on a flat surface of the common heat dissipation plate 12B. Accordingly, the heat dissipation plate 12B is formed such that its flat surface is larger than the projected area of the two coil units 1A and 1B. Therefore, the flat surface of the heat dissipation plate 12B is exposed, at a portion thereof, outside the respective coil units 1A and 1B, around their outer peripheral portions. Accordingly, the flat surface of the heat dissipation plate 12B, which is the upper surface thereof, has an area larger than the sum of the bottom areas of the respective coil units 1A and 1B. As a result thereof, in the induction heating cooker according to the third embodiment, the heat dissipation plate 12B has higher cooling performance and, also, has a function of reducing magnetic fields leaking from the induction heating cooker to the outside, due to circulating electric currents induced around the outer peripheral portions of the respective coil units 1A and 1B.

Further, in the induction heating cooker according to the third embodiment, the single heat dissipation plate 12B is pushed toward a top plate 3 with a spring 13 (see FIG. 1), so that the two coil units 1A and 1B are pressed against the top plate 3, at the same time, with a heat insulation portion 11 interposed therebetween. This can eliminate a supporting member such as a spring for substantially elastically supporting the coil units and the like, thereby improving the assemblability (the workability) and reducing the space therein.

Further, in the induction heating cooker according to the third embodiment, as illustrated in FIG. 8, the flat surface of the heat dissipation plate 12B, which is the upper surface thereof, is provided with plural grooves (concave and convex portions) 24 with curved cross-sections, in its portion which is not in contact with the coil units 1A and 1B. These grooves 24 formed as described above substantially can increase the surface area of the heat dissipation plate 12B, further improve the cooling performance and, further, increase the rigidity of the heat dissipation plate 12B. Accordingly, with the structure of the induction heating cooker according to the third embodiment, it is possible to certainly support the plural coil units 1A and 1B at predetermined set positions, with a minimum necessary number of supporting members. Further, with the structure of the induction heating cooker according to the third embodiment, it is possible to reduce the variation of the distance between the heating coil 4 and the to-be-heated object 2. This enables fabrication of an induction heating cooker having stabilized performance, with lower costs.

The direction of the extension of the grooves 24 formed on the heat dissipation plate 12B is not limited to a single direction and, as illustrated in FIG. 8, they can be formed in various directions such as a combination of a longitudinal direction and a lateral direction of the heat dissipation plate 12B, which can further improve the rigidity of the heat dissipation plate 12B.

Further, while the induction heating cooker according to the third embodiment has been described with respect to an example where the two coil units 1A and 1B are placed on the single heat dissipation plate 12B, the present invention is not limited to this example, and three or more coil units can be placed on a single heat dissipation plate.

As described above, with the structure of the inductive heating device according to the present invention, it is possible to efficiently diffuse heat from the induction heating coil and certainly transmit it to the heat dissipation plate for efficiently cooling the induction heating coil and, further, it is possible to realize a coil unit with a reduced thickness and a reduced space. Therefore, with the present invention, it is possible to reduce the quantity of blown cooling air, which can reduce noise, thereby providing a more-comfortable and energy-saving inductive heating device. Further, the technical concept of the present invention provides a structure which is also effective in small-sized table-stand type induction heating cookers and kitchen-table-embedded type induction heating cookers.

Fourth Embodiment

Figure 9:
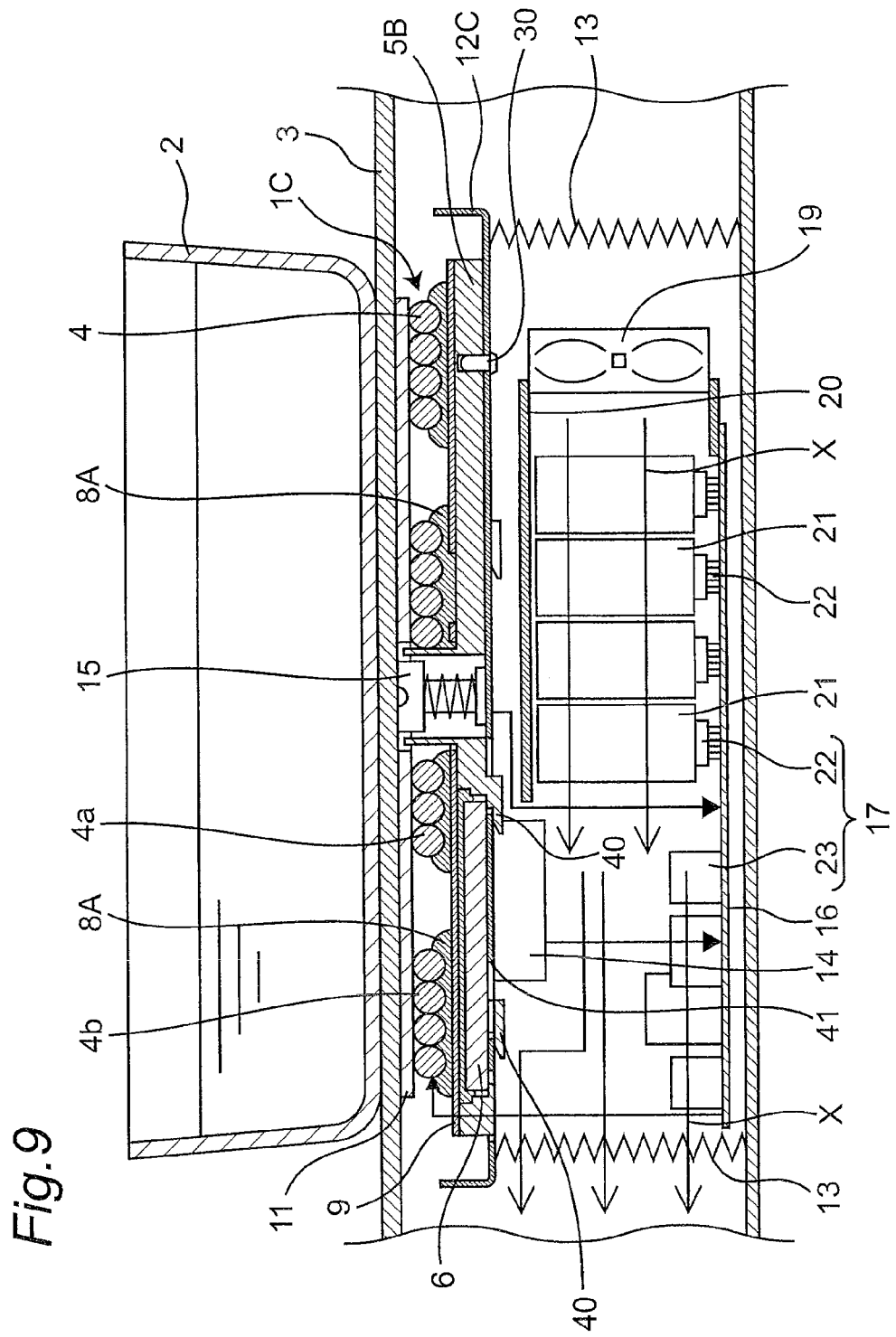
FIG. 9 is a cross-sectional view schematically illustrating the structure of an induction heating cooker according to a fourth embodiment of the present invention.
Figure 10:
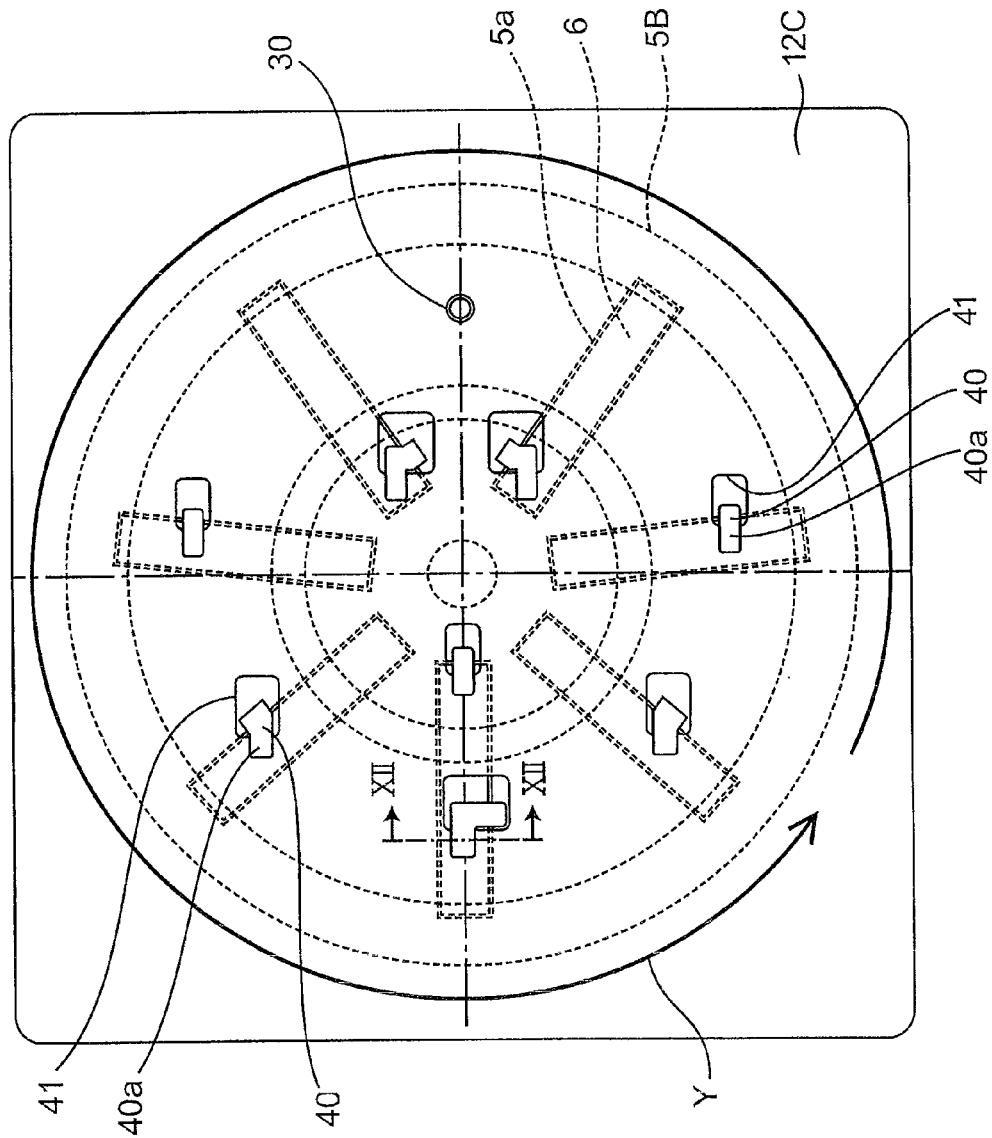
FIG. 10 is a rear view illustrating the induction heating cooker according to the fourth embodiment, in a state where a heat dissipation plate is mounted on a coil unit.
Figure 11:
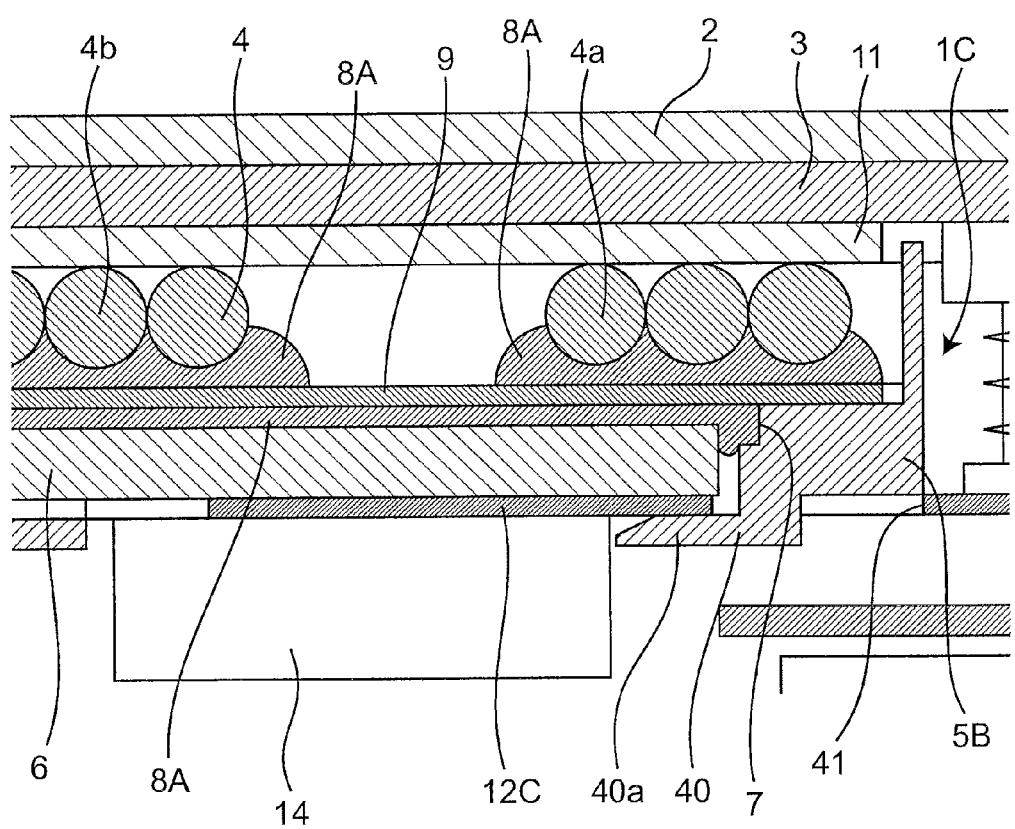
FIG. 11 is an enlarged cross-sectional view illustrating the induction heating cooker according to the fourth embodiment, in a state where the tip end portions of hooks are fitted to portions of the edges of through holes in the heat dissipation plate.
Figure 12A:
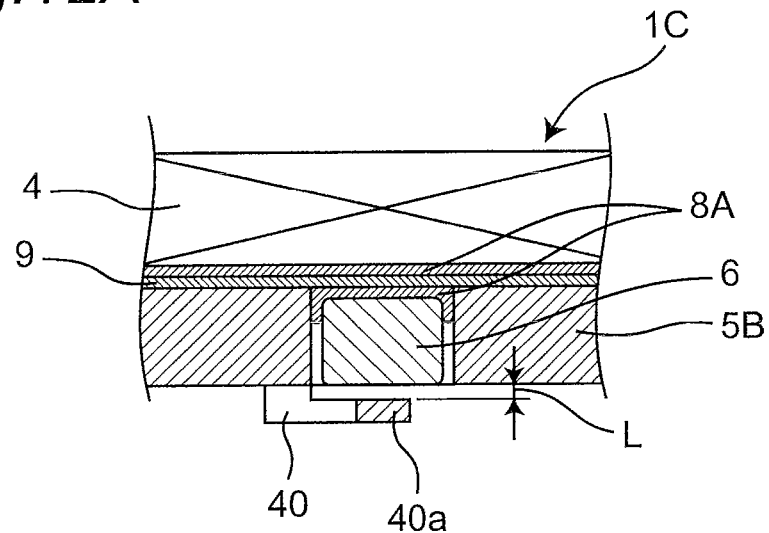
FIG. 12A is a cross-sectional view illustrating, in an enlarging manner, a portion of the coil unit in the induction heating cooker according to the fourth embodiment.
Figure 12B:
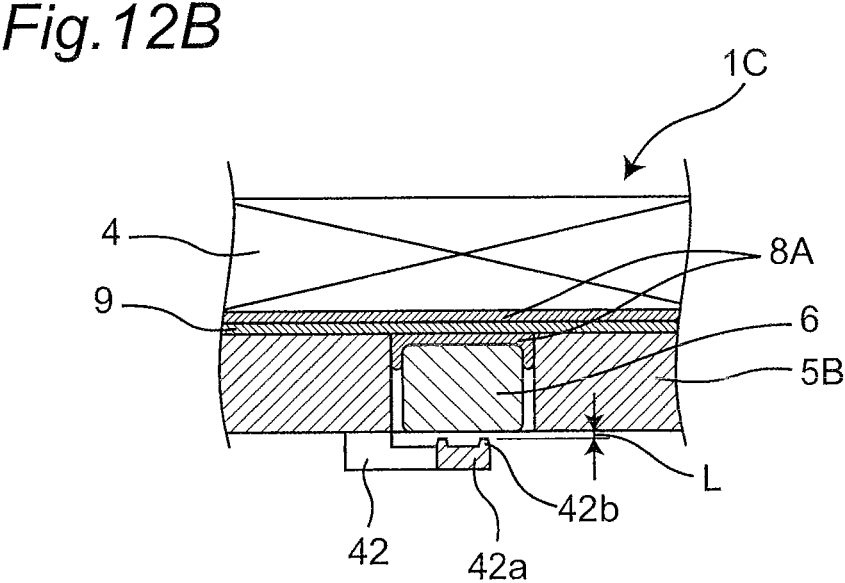
FIG. 12B is an enlarged cross-sectional view illustrating an another example of a coil unit in the induction heating cooker according to the fourth embodiment.

Next, there will be described an induction heating cooker according to a fourth embodiment of the present invention, with reference to the accompanying FIGS. 9, 10, 12A and 12B. FIG. 9 is a cross-sectional view schematically illustrating the structure of the induction heating cooker according to the fourth embodiment. FIG. 10 is a rear view of a heat dissipation plate, illustrating a state where the heat dissipation plate is mounted on a coil unit in the induction heating cooker according to the fourth embodiment. FIG. 11 is a cross-sectional view illustrating, in an enlarging manner, a vicinity of the coil unit in the induction heating cooker according to the fourth embodiment. FIG. 12A and FIG. 12B are enlarged cross-sectional views illustrating main parts of the induction heating cooker according to the fourth embodiment. Further, FIG. 12A is a cross-sectional view taken along the line XII-XII in FIG. 10.

Further, in the description of the fourth embodiment, elements having the same functions and structures as those of the first embodiment will be designated by the same reference characters, and description of these elements will be omitted by substituting the description in the first embodiment therefor.

The induction heating cooker according to the fourth embodiment is different from the induction heating cooker according to the aforementioned first embodiment, in terms of the way of securing the coil unit to the heat dissipation plate. In the induction heating cooker according to the fourth embodiment, the coil unit 1C includes a heating coil 4, a mica plate 9, ferrites 6, and a coil base 5B, and they are integrated with each other through an adhesive agent 8A as a heat conductive member, similarly to in the aforementioned first embodiment.

As illustrated in FIG. 9, in the induction heating cooker according to the fourth embodiment, on an upper surface of a main body forming the outer contour, there is provided a top plate 3 for placing a to-be-heated object 2 thereon. Further, under the top plate 3, there is placed a heating coil 4 for inductively heating the to-be-heated object 2.

The heating coil 4 is constituted by an inner coil 4a and an outer coil 4b which are connected in series with each other and, also, are placed substantially concentrically. Under the heating coil 4, there is provided a coil base 5B made of a heat-resistant resin. The coil base 5B is provided with plural housing holes 5a with a rectangular shape which are formed radially.

Each housing hole 5a houses a ferrite 6 having a magnetic-flux concentrating property, thereby restraining downward magnetic fluxes from the heating coil 4. In the fourth embodiment, similarly, the housing holes 5a in the coil base 5B are provided with positioning protrusions 5b, so that the coil base 5B and the ferrites 6 are placed such that their lower surfaces are flushed with each other. The coil base 5B and the ferrites 6 placed in the housing holes 5a as described above are secured to each other through the adhesive agent 8A as a heat conductive member and, also, are in a state where they are thermally coupled to each other.

Between the heating coil 4 and the ferrites 6 and between the heating coil 4 and the coil base 5B, there is placed a mica plate 9 as an electrical insulating member. On the opposite surfaces of the mica plate 9 in its area facing the heating coil 4, the adhesive agent 8A, which also serves as a heat conductive member, is provided, so that the heating coil 4 and the mica plate 9, the mica plate 9 and the ferrites 6, and the mica plate 9 and the coil base 5B are mechanically adhered to each other, and they are also thermally coupled to each other.

As described above, convexities and concavities formed by the wires in the heating coil 4, and variations of the thickness-wise size of the ferrites 6 are absorbed by the adhesive agent 8A, and the coil unit 1C is integrated in a state where the coil base 5B and the ferrites 6 are held flushed with each other at their lower surfaces.

As described above, in the induction heating cooker according to the fourth embodiment, the adhesive agent 8A as the adhesion member used for coupling the coil base 5B and the ferrites 6 to each other is also used for thermally coupling the heating coil 4 and the mica plate 9 to each other, for thermally coupling the mica plate 9 and the ferrites 6 to each other and for thermally coupling the mica plate 9 and the coil base 5B to each other. Since the adhesive agent 8A functions as both the adhesion member and the heat conductive member, as described above, by adjusting the shape and the capacity of adhesion portions 7 (see FIG. 9 and FIG. 11) formed in the housing holes 5a, and the amount of the adhesive agent 8A provided in the adhesion portions 7, in adhering the mica plate 9 and the ferrites 6 to each other, it is possible to adhere both the ferrite 6 and the coil base 5B thereto at the same time. By employing this assembling method, it is possible to reduce the number of working processes, which facilitates the assembling, thereby largely improving the assemblability.

The mica plate 9 is provided with plural coupling holes 9a (see FIG. 5), at portions of its area faced to both the heating coil 4 and the coil base 5B. These coupling holes 9a are filled with the adhesive agent 8A, so that the heating coil 4 and the coil base 5B are directly adhered to each other and, thus, are certainly secured to each other.

As described above, in the induction heating cooker according to the fourth embodiment, the heating coil 4 and the coil base 5B, and the heating coil 4 and the ferrites 6 are secured to each other, such that the mica plate 9 which is prone to exfoliation and has a relatively-lower mechanical strength is sandwiched therebetween. However, the heating coil 4 and the coil base 5B are directly adhered to each other and, also, the coil base 5B and the ferrites 6 are directly secured to each other. Accordingly, in the induction heating cooker according to the fourth embodiment, the coil unit 1C including the heating coil 4, the coil base 5B, the ferrites 6 and the mica plate 9 has an excellent mechanical strength in its entirety and, therefore, has a structure having an excellent strength against vibrations, drops and the like during shipments thereof.

Since the induction heating cooker according to the fourth embodiment employs the sheet-plate type mica plate 9 as an electrical insulating member, it is possible to reduce the distance between the heating coil 4 and the ferrites 6, in a state where electrical insulation therebetween is secured. This enables reducing the thickness of the entire coil unit 1C and, also, enables maintaining the electrically-insulating state, even in the event of abnormal heat generation from the heating coil 4.

Further, in the induction heating cooker according to the fourth embodiment, there is provided an heat insulation portion 11 made of a heat-insulation material such as a ceramic fiber, between the heating coil 4 and the top plate 3, in order to interrupt heat from the to-be-heated object 2 being heated, for alleviating the influence of heat from the to-be-heated object 2 on the heating coil 4.

In the induction heating cooker according to the fourth embodiment, the coil unit 1C is directly placed on the heat dissipation plate 12C made of a material having excellent thermal conductivity, such as aluminum. In the integrated coil unit 1C, the coil base 5B and the ferrites 6 are flushed with each other at their lower surfaces, so that the coil base 5B and the respective ferrites 6 are certainly in contact with the flat surface of the heat dissipation plate 12C, which is the upper surface thereof, and, thus, they are integrated with each other.

In the induction heating cooker according to the fourth embodiment, there are provided plural hooks 40 protruded from the lower surface of the coil base 5B. The hooks 40 are formed integrally with the coil base 5B. The hooks 40 are formed on the lower edge portions of the housing holes 5a for housing the ferrites 2, and the hooks 40 are extended, at their tip end portions, in parallel with the lower surface of the coil base 5B, toward positions under the housing holes 5a.

FIG. 10 is a rear view of the heat dissipation plate 12C, illustrating a state where the heat dissipation plate 12C is secured to the coil base 5B through the hooks 40 formed in the coil base 5B. As illustrated in FIG. 10, the respective hooks 40 are structured to pinch portions of the heat dissipation plate 12C, at their areas facing the positions at which the ferrites 6 are housed. Further, the tip end portions of the hooks 40 are protruded in the same direction and are formed to be protruded in the leftward direction in FIG. 10. Referring to FIG. 10, a reference character 41 designates through holes with a substantially-rectangular shape which are formed in the heat dissipation plate 12C. The through holes 41 are holes for passing the hooks 40 therethrough, in securing the heat dissipation plate 12C to the coil unit 1C. The tip end portions of the hooks 40 passed through the through holes 41 are adapted to pinch portions of the edges of the through holes 41 for securing the heat dissipation plate 12C to the coil base 5B. FIG. 11 is an enlarged cross-sectional view illustrating a state where the tip end portions 40a of the hooks 40 passed through the through holes 41 pinch portions of the edges of the through holes 41 in the heat dissipation plate 12C between these tip end portions 40a and the ferrites 6, so that the heat dissipation plate 12C is secured to the coil unit 1C.

As described above, the heat dissipation plate 12C is pinched, at portions thereof, by the hooks 40 at positions in the coil base 5B where the ferrites 6 are housed therein, so that the heat dissipation plate 12C is secured to the coil base 5B at predetermined positions. The coil base 5B and the ferrites 6 are formed such that their lower surfaces are flushed with each other, and the coil base 5B is placed on the flat surface of the heat dissipation plate 12C and is secured thereto through the hooks 40 as described above. Therefore, the ferrites 6 having relatively-higher thermal conductivity which are thermally coupled to the heating coil 4 are certainly in contact, at their lower surfaces, with the upper surface of the heat dissipation plate 12C, and the coil base 5B and the heat dissipation plate 12C are mechanically integrated with each other.

As illustrated in FIG. 10, the tip end portions 40a of the plural hooks 40 formed in the coil base 5B are formed at positions just under the inner coil 4a and the outer coil 4b in the heating coil 4. Further, the tip end portions 40a of the plural hooks 40 are placed at positions facing the housing holes 5a which house the ferrites 6. As described above, the hooks 40 are protruded from the lower edges of the housing holes 5a and, further, are formed such that the tip end portions 40a of the hooks 40 are positioned under the housing holes 5a. In the fourth embodiment, each housing hole 5a is provided with at least a single hook 40.

In the induction heating cooker according to the fourth embodiment, the plural hooks 40 are placed on substantially concentric circles in the coil base 5B having a substantially-circular-shaped lower surface (back surface), and the plural hooks 40 are formed on two concentric circles just under the inner coil 4a in the inner periphery side and the outer coil 4b in the outer periphery side. Further, the plural hooks 40 provided on concentric circles are placed, such that the number of the hooks placed in the outer periphery side is larger than the number of the hooks 40 placed in the inner periphery side, and the plural hooks 40 are placed substantially evenly on the lower surface of the coil base 5B.

Further, in the induction heating cooker according to the fourth embodiment, a single fixing screw 30 is provided as means for securing the coil unit 1C and the heat dissipation plate 12C to each other. The fixing screw 30 is adapted to be screwed into the coil base 5B with the heat dissipation plate 12V interposed therebetween, with respect to the heat dissipation plate 12C and the coil unit 1C secured to each other through the hooks 40, thereby certainly securing the coil unit 1C and the heat dissipation plate 12C to each other. The fixing screw 30 is provided at a position just under the heating coil 4 and is formed just under the outer coil 4b in the fourth embodiment. Further, the fixing screw 30 is formed at a position in an area between housing holes 5a adjacent to each other (a midway position), in the lower surface of the coil base 5B having the plural housing holes 5a formed radially. Accordingly, the hooks 40 are not formed in the area of the lower surface of the coil base 5B in which the fixing screw 30 is screwed thereinto and the heat dissipation plate 12C is secured thereto.

As described above, the coil base 5B is provided, in its lower surface, with the plural hooks 40, and a single screw hole for the fixing screw 30, in addition to the radial housing holes 5a. Further, the plural hooks 40, and the single screw hole for the fixing screw 30 are formed in the lower surface of the coil base 5B, at positions which are set at substantially-even intervals and are not concentrated, such that the ferrites 6 housed in the housing holes 5a are certainly in contact with the flat surface of the heat dissipation plate 12C, and they are integrated with each other.

As described above, with the induction heating cooker according to the fourth embodiment, in order to secure the heat dissipation plate 12C to the coil unit 1C, the hooks 40 are passed through the through holes 41, and the heat dissipation plate 12C is slid in a single direction parallel to the lower surface of the coil unit 1C, which causes the tip end portions 40a of the hooks 40 to pinch the edges of the through holes 41 together with the coil base 5B (or the ferrites 6). Accordingly, the tip end portions 40a of all the hooks 40 are protruded in the same direction.

FIG. 12A is a cross-sectional view illustrating a portion of the coil unit 1C, in an enlarging manner, illustrating a hook 40 formed near a housing hole 5a housing a ferrite 6. In FIG. 12A, the coil unit 1C is illustrated as being in a state where the heat dissipation plate 12C has not been mounted thereto yet.

As illustrated in FIG. 12A, there is provided a gap L between the tip end portion 40a of the hook 40 and the lower surface of the coil base 5B (the lower surface of the ferrite 6). This gap L is made to be equal to or slightly smaller than the thickness of the heat dissipation plate 12C. Therefore, when the heat dissipation plate 12C is partially inserted between the tip end portions 40a of the hooks 40 and the lower surface of the coil base 5B (the lower surfaces of the ferrites 6) for securing the heat dissipation plate 12C thereto, the heat dissipation plate 12C is press-fitted thereinto while bending the hooks 40 in the vertical direction. Thus, the heat dissipation plate 12C is secured to the coil unit 1C, by pinching portions of the heat dissipation plate 12C with the tip end portions 40a of the hooks 40.

After the coil unit 1C and the heat dissipation plate 12C are secured to each other through the hooks 40 as described above, the fixing screw 30 is screwed into the coil base 5B with the heat dissipation plate 12C interposed therebetween, which causes the coil unit 1C and the heat dissipation plate 12C to be certainly integrated with and secured to each other.

Further, the shape of the hooks 40 is not limited to the shape illustrated in FIG. 12A and can be any shape capable of integrally securing the heat dissipation plate 12C to the coil unit 1C. For example, it is possible to employ a hook 42 having a shape as illustrated in FIG. 12B. The hook 42 illustrated in FIG. 12B includes a rib 42b provided in the surface of its tip end portion 42a which faces the lower surface of the coil base 5B. By forming the rib 42b as described above and varying the height and the width of the rib 42b, it is possible to adjust the gap L between the tip end portion 42a of the hook 42 and the lower surface of the coil base 5B (or the lower surface of the ferrite 6), thereby adjusting the friction force induced in press-fitting.

In the induction heating cooker according to the fourth embodiment, the heat dissipation plate 12C is formed such that its flat surface, which is the upper surface thereof, is larger than the vertically-projected area of the heating coil 4. Therefore, due to effects of the magnetic field generated from the heating coil 4 being excited, a circulating electric current (an electric current designated by an arrow Y in FIG. 10) is induced in the outer peripheral portion of the heat dissipation plate 12C outside the heating coil 4. This circulating electric current outside the heating coil 4 excites a magnetic field which acts in the opposite direction from that of the magnetic field generated from the heating coil 4, thereby reducing magnetic fields leaking from the induction heating cooker to the outside.

Further, between the bottom portion of the main body and the heat dissipation plate 12C, there is provided a spring 13, and the heat dissipation plate 12C is biased upwardly by the spring 13. Therefore, the heating coil 4 is pushed toward the lower surface of the top plate 3 with the heat insulation portion 11 interposed therebetween. At this time, the distance between the heating coil 4 and the top plate 3 is maintained at a predetermined size, due to a spacer (not illustrated) provided on the coil base 5B.

Further, in the induction heating cooker according to the fourth embodiment, there is provided an infrared sensor 14. The infrared sensor 14 is placed at a position under the top plate 3 which faces the bottom surface of the to-be-heated object 2 placed at a predetermined position on the top plate 3. The infrared sensor 14 is adapted to detect, through the top plate 3, infrared rays radiated from the bottom surface of a cooking container or the like, and is adapted to output, to a control circuit 16, signals corresponding to the detected temperature.

Further, in the induction heating cooker according to the fourth embodiment, there is provided a thermistor 15. The thermistor 15 is placed at a position faced to a center of the bottom surface of the to-be-heated object 2 and is structured to be pressed against the back surface of the top plate 3. The thermistor 15 outputs, to the control circuit 16, signals corresponding to the temperature of the top plate 3 opposing to the bottom surface of the cooking container or the like.

The control circuit 16, to which signals from the infrared sensor 14 and the thermistor 15 are inputted, is placed under the coil unit 1A and is provided on a control board placed at a position near the infrared sensor 14 and the thermistor 15. The control circuit 16 is adapted to control the output of the heating coil 4, based on signals outputted from the infrared sensor 14 and the thermistor 15.

Further, in the induction heating cooker according to the fourth embodiment, there is provided a blower 19 for creating cooling air for cooling heat generating components in the control circuit 16 and, further, there is provided a duct 20 for directing the cooling air from the blower 19 to the heat generating components 17. Further, the infrared sensor 14 is placed on the lower side of the heat dissipation plate 12C and is placed near the outlet of the guide 20 for guiding the cooling air from the blower 19 (see FIG. 9).

In the induction heating cooker according to the fourth embodiment, the infrared sensor 14 and the control circuit 16 are placed under the ferrites 6 in the coil unit 1C, and the magnetic shielding effect of the ferrites 6 alleviates the influence of magnetic fluxes from the heating coil 4 on the infrared sensor 14 and the control circuit 16. Further, in order to eliminate the influence of magnetic flux leaks, the heat dissipation plate 12C having the flat surface larger than the projected area of the heating coil 4 is placed under the coil base 5B housing and holding the ferrites 6 therein.

In the induction heating cooker according to the fourth embodiment, the heat dissipation plate 12C having an area larger than the projected area of the heating coil 4 is placed to separate a heating space in which the coil unit 1C including the heating coil 4 is placed, from a cooling space in which the duct 20, the infrared sensor 14 and the control circuit 16 are placed. Accordingly, the heat dissipation plate 12C certainly alleviates the influence of magnetic fluxes from the heating coil 4 in the heating space on the respective components in the cooling space.

Further, the infrared sensor 14, and the heat generating components 17 in the control circuit 16, such as the resonant capacitors 23 and the switching device 22 (IGBT) coupled to the heat sink 21 placed inside the duct 20 are cooled to a desired temperature by the cooling air X (see FIG. 9) from the blower 19 provided inside the main body. Further, the cooling air X having cooled the heat generating components 17 comes into contact with the lower surface of the heat dissipation plate 12C to cool the heat dissipation plate 12C and, thereafter, is discharged to the outside of the device.

Next, there will be described effects of the induction heating cooker having the aforementioned structure according to the fourth embodiment.

As described above, in the induction heating cooker according to the fourth embodiment, the respective lower surfaces of the coil base 5B and the ferrites 6, which foam the bottom surface of the integrated coil unit 1C, are flushed with each other and are secured to the flat surface of the heat dissipation plate 12C, so that the coil unit 1C is thermally coupled, at its substantially entire bottom surface, to the heat dissipation plate 12C for allowing heat conduction therebetween with higher efficiency. Further, in the induction heating cooker according to the fourth embodiment, there are provided the hooks 40 protruding from the lower edge portions of the housing holes 5a in the coil base 5B which house the ferrites 6, so that the coil unit 1C and the heat dissipation plate 12C are mechanically and certainly secured to each other. Since the coil unit 1C and the heat dissipation plate 12C are mechanically secured to each other as described above, the ferrites 6 and the heat dissipation plate 12C are intimately and mechanically coupled to each other with no vacancy (air layer) interposed therebetween, which allows heat conduction from the ferrites 6 to the heat dissipation plate 12C with no air layer interposed therebetween.

Further, in the induction heating cooker according to the fourth embodiment, the hooks 40 and the heat dissipation plate 12C are secured to each other, at positions just under the respective heating coils 4a and 4b. The positions where the heat dissipation plate 12C is secured by the hooks 40 are positions at which the heat dissipation plate 12C is in contact with the ferrites 6, under midway portions of radial widths of the respective heating coils 4a and 4b. Therefore, at positions which are faced to and just under the heating coils 4a and 4b which are heat generating portions, the coil unit 1C and the heat dissipation plate 12C are certainly in contact with each other and, thus, are coupled to each other, so that the ferrites 6 and the heat dissipation plate 12C are certainly in intimate contact with each other, thereby reducing the thermal resistance therebetween. Accordingly, heat generated from the heating coil 4 (4a, 4b) is transmitted to the ferrites 6 having a relatively-higher heat conductivity, further is diffused within the ferrites 6 and, thereafter, is transmitted to the heat dissipation plate 12C, which enhances the cooling effect, thereby efficiently lowering the temperatures of the surfaces of the heating coil 4 (4a and 4b).

Further, in the induction heating cooker according to the fourth embodiment, the coil base 5B is provided with the housing holes 5a for housing the ferrites 6 at predetermined positions, and the heating coil 4 (4a and 4b), the mica plate 9, and the coil base 5B housing and holding the ferrites 6 are assembled through the adhesive agent 8A to form the coil unit 1C. Thereafter, the coil unit 1C is placed on the heat dissipation plate 12C and is secured thereto through the hooks 40, thereby largely improving the assemblability.

Further, in the induction heating cooker according to the fourth embodiment, the coil base 5B formed from a resin material is provided with the hooks 40 and, therefore, the hooks 40 can be easily formed to have elasticity. Further, all the tip end portions 40a of the hooks 40 are protruded in a direction parallel with the lower surface of the coil base 5B and, also, are directed in the same direction. Therefore, only by sliding the heat dissipation plate 12C in the opposite direction from the direction of the protrusion of the tip end portions 40a of the hooks 40, after the coil base 5B is placed on the heat dissipation plate 12C, the hooks 40 are engaged with the edge portions of the through holes 41, thereby causing the heat dissipation plate 12C to be secured to the coil base 5B. Thus, through such simple assembling operations, the heat dissipation plate 12C is certainly secured to the coil base 5B at predetermined positions, thereby causing the coil unit 1C having the heating coils 4a and 4b to be secured to the heat dissipation plate 12C with high thermal conductivity provided therebetween.

In the present invention, the number of the hooks 40 formed in the lower surface of the coil base 5B is not limited. Even if the number of the hooks 40 is increased, the number of assembling processes required for assembling operations is not varied. Accordingly, by increasing the number of the hooks 40, it is possible to easily increase the strength of the mounting of the coil base 5B to the heat dissipation plate 12C.

Further, in assembling, after the heat dissipation plate 12C is slid to be secured to the coil base 5B, the heat dissipation plate 12C and the coil base 5B are adhered and secured to each other through the fixing screw 30, which can eliminate the risk of disengagement of the heat dissipation plate 12C and the coil base 5B from each other in the pinched state, due to vibrations and the like during shipments.

In the induction heating cooker according to the fourth embodiment, the hooks 40 formed in the lower surface of the coil base 5B are adapted to engage with the heat dissipation plate 12C, in order to mount the heat dissipation plate 12C to the coil base 5B. Due to this structure, as described above, a circulating electric current is induced in the heat dissipation plate 12C outside the heating coils 4a and 4b, and this circulating electric current excites a magnetic field which acts in the opposite direction from that of the magnetic field generated from the heating coils 4a and 4b, thereby reducing magnetic fields leaking from the induction heating cooker to the outside.

If there is formed no hook as described above, this will induce problems as follows. For example, in order to secure the coil unit placed on the heat dissipation plate, the heat dissipation plate can be possibly provided with plural protruding claws around the coil unit through pressing, and the coil unit can be held thereon through these claws. In this case, the heat dissipation plate should be provided with through holes due to the provision of the claws around the outer peripheral portion of the coil base, which prevents the occurrence of a circulating electric current outside the heating coils, thereby inducing the problem that magnetic fields leaking from the induction heating cooker to the outside cannot be reduced.

With the structure according to the fourth embodiment, there is no obstruction on the heat dissipation plate 12C, against the circulating electric current induced around the coil unit 1C due to effects of the magnetic field generated from the heating coils 4a and 4b. As a result thereof, in the induction heating cooker according to the fourth embodiment, a circulating electric current flows smoothly through the heat dissipation plate, and this electric current excites a magnetic field which sufficiently acts in the opposite direction from that of the magnetic field generated from the heating coils 4a and 4b. This largely reduces magnetic fields leaking from the induction heating cooker to the outside.

Further, in the structure according to the fourth embodiment, the hooks 40 are placed at positions under the heating coils 4a and 4b. Further, the plural hooks 40 are placed substantially evenly, in the lower surface of the coil base 5B, with predetermined distances interposed therebetween, in both the circumferential direction and the radial direction. Further, in the lower surface of the coil base 5B, the hooks 40 are placed along substantially-concentric circles, such that the number of the hooks 40 in the outer-periphery side is larger than that in the inner-periphery side. Therefore, the heat dissipation plate 12C is secured substantially evenly to the entire lower surface of the coil base 5B. As a result thereof, deformations of the heat dissipation plate 12C can be suppressed, which improves the rigidity of the heat dissipation plate 12C. Furthermore, the temperature distribution gradients in the heat dissipation plate 12C are reduced, thereby improving the cooling effect.

With the structure of the fourth embodiment, the heating coils 4a and 4b held by the coil unit 1C are adapted to be biased, by elastic means, toward the top plate 3 on the upper surface of the main body. Therefore, the heating coils 4a and 4b are designed such that the distance therefrom to the to-be-heated object 2 is maintained constant. Further, with the structure of the fourth embodiment, the heat dissipation plate 12C has improved rigidity as described above, which can suppress deformations of the heat dissipation plate 12C due to the biasing of the heating coils 4a and 4b toward the top plate 3. This can reduce the variation in the distance between the heating coils 4a and 4b and the to-be-heated object 2, thereby further stabilizing the performance of the induction heating cooker.

In the fourth embodiment, the hooks 40 are not provided near the pilot hole for screwing the fixing screw 30 thereinto, in the lower surface of the coil base 5B. This can simplify the shape of the coil base 5B, while maintaining the intimate contact between the coil unit 1C and the heat dissipation plate 12C. Further, the number of the hooks 40 can be reduced, which can reduce the friction between the coil base 5B and the heat dissipation plate 12C in sliding the heat dissipation plate 12C during assembling, thereby realizing a structure with improved workability and assemblability.

In the fourth embodiment, in assembling the coil unit 1C and the heat dissipation plate 12C, the heat dissipation plate 12C is press-fitted into the gap L between the lower surface of the coil base 5B (the lower surfaces of the ferrites 6) and the tip end portions 40a of the hooks 40 while bending the tip end portions 40a of the hooks 40 in the vertical direction. Thus, since the heat dissipation plate 12C is press-fitted into the gap L so that the coil unit 1C and the heat dissipation plate 12C are integrally secured to each other, it is possible to realize a structure which prevents occurrences of vacancies between the heat dissipation plate 12C and the lower surface of the coil base 5B and between the heat dissipation plate 12C and the lower surfaces of the ferrites 6, near the hooks 40, even in the event of contraction or expansion of the coil base 5B and the heat dissipation plate 12C due to heat and the like. As a result thereof, heat induced from the heating coils 4a and 4b is efficiently transmitted to the heat dissipation plate 12C through the coil base 5B and the ferrites 6.

In the structure according to the fourth embodiment, the hooks 40 are formed in the lower surface of the coil base 5B, near the edges of the housing holes 5a for housing the ferrites 6, so that the heat dissipation plate 12C and the ferrites 6 with higher heat conductivity than those of resin materials are pressed against each other by the hooks 40 and, thus, are integrally secured to each other with no vacancy interposed therebetween. This results in further reduction of the thermal resistance between the ferrites 6 and the heat dissipation plate 12C.

In the fourth embodiment, the hooks 40 are placed at positions under the housing holes 5a housing the ferrites 6, which enables utilizing the opening portions necessary for forming the hooks 40, as the housing holes 5a. This enables forming the desired hooks 40 without degrading the strength of the coil base 5B, since there is no need for forming additional opening portions in the coil base 5B.

If opening portions are formed in the coil base 5B only for forming the hooks 40, for example, this will reduce the volume (capacity) of the coil base 5B, thereby reducing the capacity thereof as a heat conduction path. This will reduce the heat transmitted to the heat dissipation plate 12C through the coil base 5B, out of heat generated from the heating coils 4a and 4b, thus resulting in degradation of the cooling performance for the heating coils 4a and 4b. Accordingly, by utilizing the opening portions for forming the hooks 40 as the housing holes 5a for housing the ferrites 6, it is possible to minimize the reduction of the capacity of the coil base 5B, thereby suppressing the degradation of the cooling performance for the heating coils 4a and 4b.

Further, while the induction heating cooker according to the fourth embodiment has been described with respect to an exemplary structure which places the tip end portions 40a of the hooks 40 only under the housing holes 5a housing the ferrites 6, the present invention is not limited to this structure, and the hooks 40 as fixing means can be formed at any positions in the lower surface of the coil base 5B. However, it is necessary that the tip end portions 40a of the hooks 40 engage with (press) the heat dissipation plate 12C, for bringing the heat dissipation plate 12C and the ferrites 6, and the heat dissipation plate 12C and the coil base 5B into intimate contact with each other with no vacancy (air layer) interposed therebetween.

For example, by substantially uniformizing the number of the hooks 40 formed per unit area in the lower surface of the coil base 5B and by providing some of the hooks 40 between adjacent housing holes 5a housing the ferrites 6, it is possible to integrate the heat dissipation plate 12C and the coil base 5B with each other, thereby increasing the rigidity of the heat dissipation plate 12C, and, also it is possible to reduce temperature gradients in the heat dissipation plate 12C, thereby enhancing the cooling effect.

Further, while the induction heating cooker according to the fourth embodiment employs the fixing screw 30 as a fixing member for securing the heat dissipation plate 12C to the coil unit 1C, it is also possible to employ a pin, an adhesive agent and the like, as the fixing member and, also, it is possible to form protrusions such as claws in the heat dissipation plate 12C such that they can be fitted to the coil unit 1C for providing a structure for preventing disengagement of the hooks 40 and the heat dissipation plate 12C from each other in the engagement state.

Further, while, in the induction heating cooker according to the fourth embodiment, there is provided a structure for guiding cooling air from the blower 19 to the duct 20 for cooling the heat generating members and the heat dissipation plate 12C at the same time, the present invention is not limited to this structure. For example, the blower 19 can be structured to slightly suck air inside the casing, as well as sucking air outside the casing, which can form air flows around the heat dissipation plate and can cause these air flows to cool the heat dissipation plate. Also, it is possible to provide an additional fan for cooling the heat dissipation plate, in order to directly cool the heat dissipation plate through air.

Further, while the induction heating cooker according to the fourth embodiment has been described with respect to an example where the single infrared sensor 14 and the single thermistor 15 are provided for the single coil unit 1C, the present invention is not limited to this structure, and two or more infrared sensors and two or more thermistors can be provided for a single coil unit, in order to enable temperature control with higher accuracy.

Further, while the fourth embodiment has been described as employing aluminum as the material of the heat dissipation plate 12C, the material of the heat dissipation plate 12C is not limited to aluminum and can be any nonmagnetic material with excellent heat resistance, rigidity, thermal conductivity and an excellent heat dissipation property, such as non-magnetic metal materials such as brass and copper.

Further, while the fourth embodiment has been described with respect to an example where the single coil unit 1C is provided on the single heat dissipation plate 12C, the present invention is not limited to this structure, and two or more coil units can be provided on a single heat dissipation plate.

Fifth Embodiment

Figure 13:
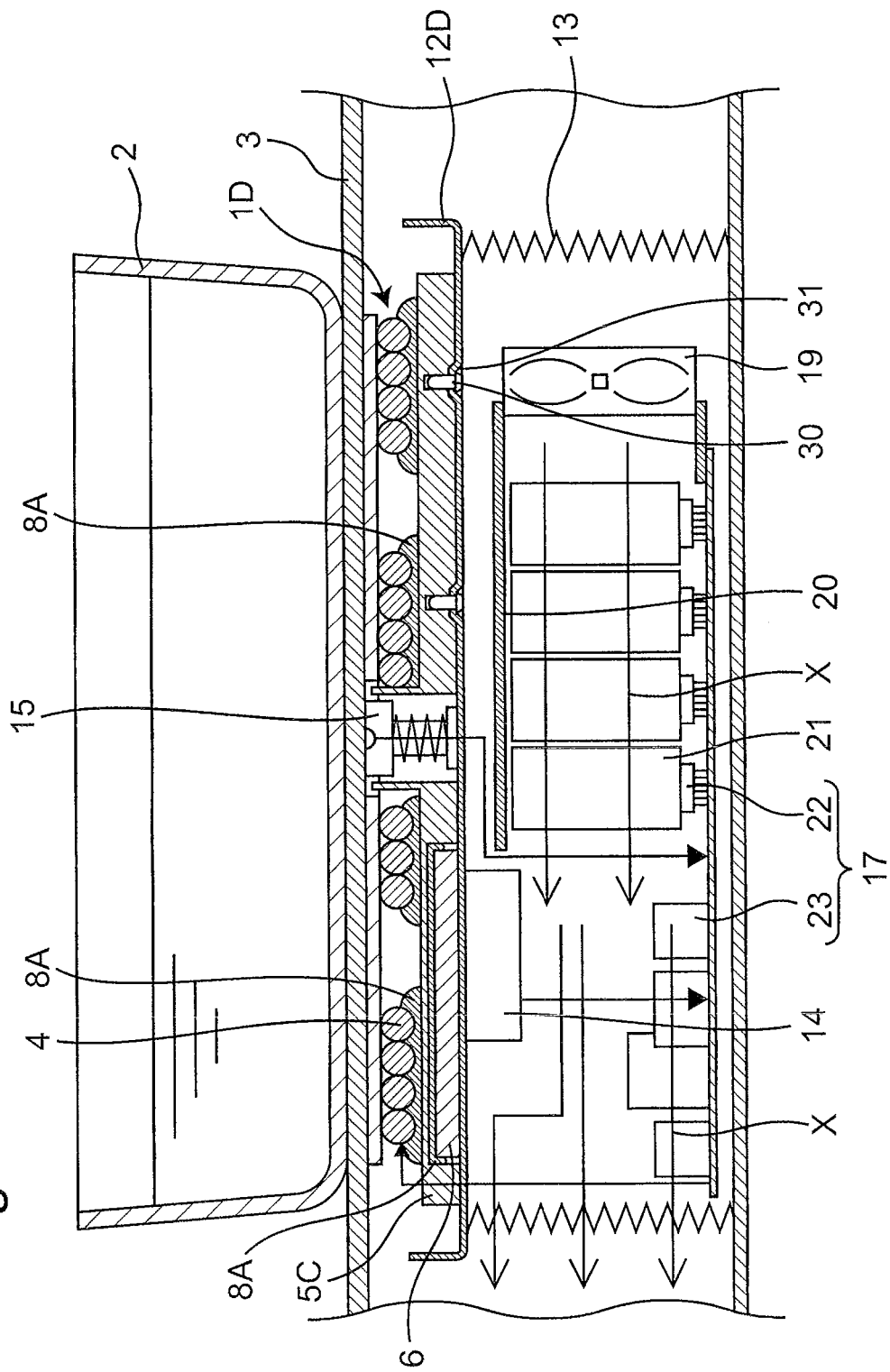
FIG. 13 is a cross-sectional view schematically illustrating the structure of an induction heating cooker according to a fifth embodiment of the present invention.
Figure 14:
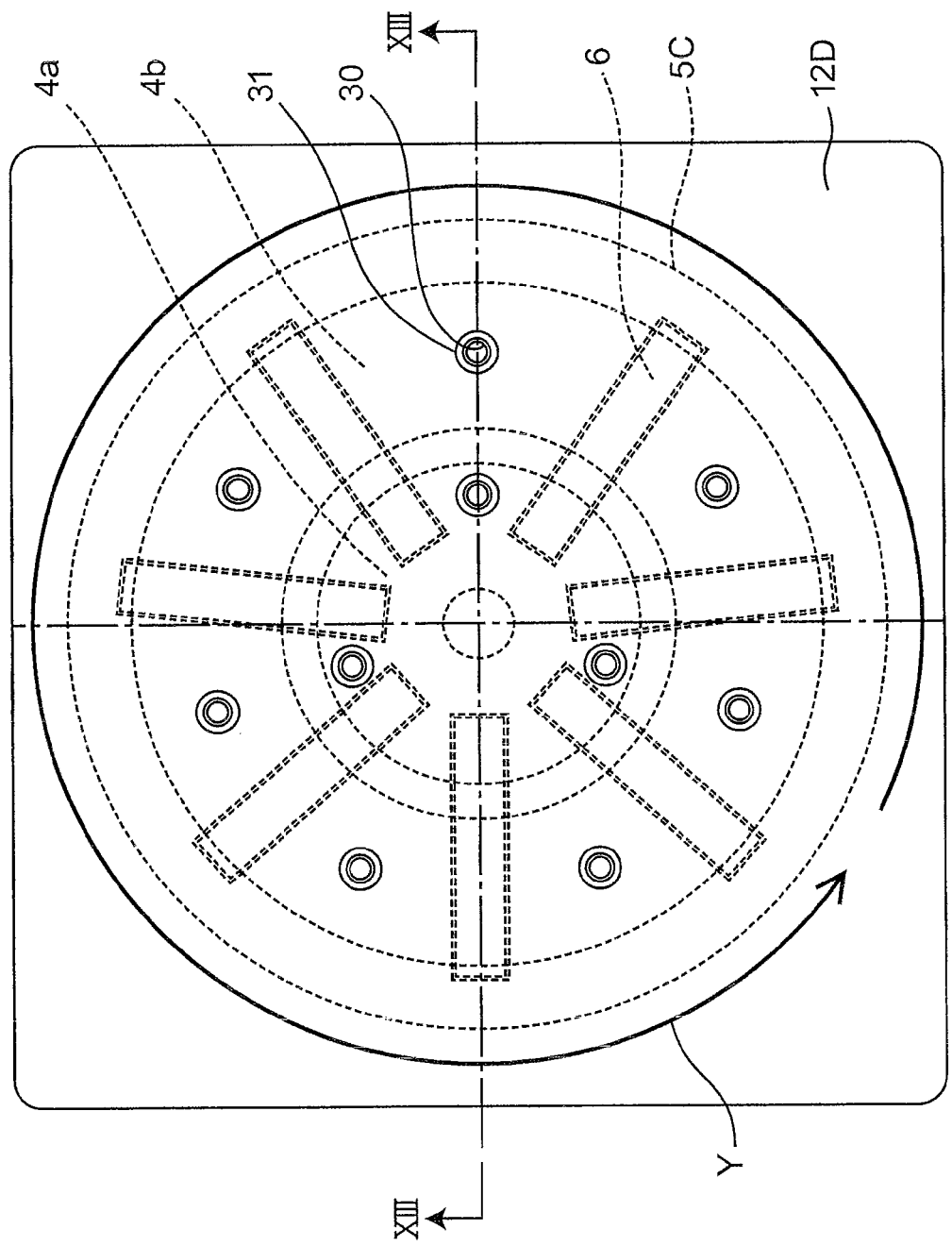
FIG. 14 is a rear view illustrating the induction heating cooker according to the fifth embodiment, in a state where a heat dissipation plate is mounted on a coil unit.

Next, there will be described an induction heating cooker according to a fifth embodiment of the present invention, with reference to the accompanying FIG. 13 and FIG. 14. FIG. 13 is a cross-sectional view schematically illustrating the structure of the induction heating cooker according to the fifth embodiment of the present invention. FIG. 14 is a rear view of a heat dissipation plate, illustrating a state where the heat dissipation plate is mounted to a coil unit in the induction heating cooker according to the fifth embodiment. Further, the cross-sectional view in FIG. 13 is a cross-sectional view taken along the line XIII-XIII in FIG. 14.

The induction heating cooker according to the fifth embodiment is different from the induction heating cooker according to the aforementioned first embodiment, in terms of the way of securing the coil unit and the heat dissipation plate to each other. Further, in the induction heating cooker according to the fifth embodiment, the coil unit 1D includes a heating coil 4, ferrites 6 and a coil base 5C, wherein the heating coil 4 and the coil base 5C, and the coil base 5C and the ferrites 6 are secured to each other, through an adhesive agent 8A as a heat conductive member.

Further, the induction heating cooker according to the fifth embodiment basically has the same structure as that of the induction heating cooker according to the aforementioned first embodiment and, therefore, will be described regarding differences therefrom, hereinafter. Further, regarding the induction heating cooker according to the fifth embodiment, its elements having the same functions and structures as those of the first embodiment will be designated by the same reference characters, and will not be described in detail.

Referring to FIG. 13 and FIG. 14, the coil base 5C placed just under the heating coil 4 is provided, substantially radially, with housing portions 5a which are opened at their lower surfaces and shaped to be concave toward the upper surface. There housing portions 5a house the ferrites 6, which restrains downward magnetic fluxes from the coil base 5C. The coil base 5C is made of a resin material with heat resistance and an electrical insulating property.

In the fifth embodiment, the coil base 5C and the ferrites 2 in the housing portions 5a are placed such that their lower surfaces are flushed with each other, and the ferrites 6 are secured to the coil base 5C through the adhesive agent 8A.

As illustrated in FIG. 14, the coil base 5C and the heat dissipation plate 12D are secured to each other, through plural fixing screws 30 as fixing means. The plural fixing screws 30 are provided in areas between the plural radial housing portions 5a in the coil base 5C and, also, are screwed into fixing-screw pilot holes at positions under the heating coil 4 (4a and 4b).

In the fifth embodiment, as illustrated in FIG. 14, the fixing screws 30 are provided at substantially-even intervals, along concentric circles, under the inner coil 4a and the outer coil 4b. Further, the fixing screws 30 are provided along the concentric circles, such that the number of the fixing screws 30 in the outer periphery side is larger than that in the inner periphery side. Further, in the surfaces of the coil base 5C and the heat dissipation plate 12D which are adhered to each other, the interval between the fixing screws 30 in the inner periphery side and the interval between the fixing screws 30 in the outer periphery side are set to be substantially the same distance. By placing the fixing screws 30 as described above, the coil base 5C and the heat dissipation plate 12D are secured to each other at their surfaces adhered to each other, through substantially the same number of the fixing screws 30 per unit area. As a result thereof, the surfaces of the coil base 5C and the heat dissipation plate 12D which are adhered to each other are in intimate contact with each other with no vacancy (air layer) interposed therebetween.

Since the plural fixing screws 30 are mounted to the heat dissipation plate 12D as described above, the heat dissipation plate 12D is provided with fixing-screw holes 31 at positions coincident with the fixing-screw pilot holes in the coil base 5C. The fixing screws 30 are penetrated through the fixing-screw holes 31, so that the heat dissipation plate 12D is secured to the coil base 5C.

As illustrated in FIG. 13, the heat dissipation plate 12D is formed to have a concave shape around each fixing-screw hole 31 formed therein, similarly to around the fixing-screw pilot holes in the coil base 5C. Thus, the heat dissipation plate 12D and the coil base 5C are both provided with concavities opened downwardly, at their portions to be coupled to the fixing screws. Due to the formation of these concavities, the fixing screws 30 are prevented from protruding, at their screw heads, from the lower surface of the heat dissipation plate 12D.

As described above, the coil base 5C and the heat dissipation plate 12D are secured to each other through the fixing screws 30, in their areas which are relatively less influenced by magnetic fluxes, between the ferrites 6 which concentrate magnetic lines of flux therein. Thus, according to the fifth embodiment, the coil base 5C and the heat dissipation plate 12D are certainly and mechanically integrated with each other, while minimizing heat generation from the fixing screws 30. This reduces the thermal resistance between the coil base 5C and the heat dissipation plate 12D, thereby improving the cooling performance of the heat dissipation plate 12D.

Further, in the structure of the fifth embodiment, the fixing screws 30 mounted in the inner periphery side are placed near the ferrites 6, which prevents the occurrence of vacancies between the heat dissipation plate 12D and the ferrites 6 with a relatively-higher heat conductivity, thereby increasing the heat transfer coefficient from the ferrites 6 to the heat dissipation plate 12D and further improving the cooling performance.

Further, in the structure of the fifth embodiment, the fixing screws 30 are prevented from protruding, at their screw heads, from the lower surface of the heat dissipation plate 12D, which makes it easier to place wires for the heating coil 4 and the thermistors, in the space under the heat dissipation plate 12D. Even when the wires are provided in the space under the heat dissipation plate 12D, these wires are prevented from hitching on the heat dissipation plate 12D, which facilitates assembling and also enables reduction of the thickness of the entire coil unit. This enables provision of an induction heating cooker with a reduced thickness.

With the structure according to the fifth embodiment, the ferrites 6 are housed in the housing holes 5a in the coil base 5C, so that the heating coil 4 and the ferrites 6 are electrically insulated from each other through the coil base 5C. This eliminates the necessity of providing a specific electrical insulating member, such as a mica plate for electrical insulation, thereby simplifying the coil unit 1D and improving the assemblability of the coil unit 1D.

Further, with the structure according to the fifth embodiment, the fixing screws 30 are provided under the heating coil 4 and are placed substantially evenly with predetermined distances interposed therebetween, in both the circumferential direction and the radial direction. Further, the fixing screws 30 are placed along respective concentric circles in the inner periphery side and the outer periphery side, and the fixing screws 30 are placed such that the number of the fixing screws 30 in the outer periphery side is larger than that in the inner periphery side. By providing the fixing screws 30 as described above, the coil base 5C and the heat dissipation plate 12D are secured to each other uniformly and integrally, at their surfaces adhered to each other. As a result thereof, deformations of the heat dissipation plate 12D are suppressed, thereby increasing the rigidity of the heat dissipation plate 12D. Further, the temperature distribution gradients in the heat dissipation plate 12D are reduced, thereby largely increasing the cooling efficiency.

Since the heat dissipation plate 12D is made to have improved rigidity as described above, the heat dissipation plate 12D supporting the coil unit 1D at a predetermined position is prevented from deforming, which reduces the variation of the distance between the heating coil 4 and the to-be-heated object 2 (for example, a cooking container), thereby stabilizing the heating performance.

Further, while in the structure according to the fifth embodiment, the heat dissipation plate and the coil unit are secured through the fixing screws 30 under each of the two heating coils 4 constituted by the inner coil 4a and the outer coil 4b which are placed in series substantially concentrically, the present invention is not limited to this structure. For example, they can be secured to each other through fixing screws in areas between the inner coil 4a and the outer coil 4b.

Areas between the inner coil 4a and the outer coil 4b are relatively less influenced by magnetic fluxes and, therefore, in such areas, it is possible to suppress heat generation from the fixing screws. Further, when these areas between the inner coil 4a and the outer coil 4b are formed from the same resin material as that of the coil unit, it is possible to secure the coil unit and the heat dissipation plate to each other using fixing screws having a length increased by an amount corresponding to the thickness of the heating coil 4. In this case, it is possible to secure portions into which the fixing screws are screwed, in the areas between the inner coil 4a and the outer coil 4b, which enables use of ferrites with a smaller thickness, thereby enabling provision of a coil unit with a reduced thickness.

Further, while the structure of the fifth embodiment has been described with respect to an example where the coil base 5C and the ferrites 6 are formed such that their lower surfaces are flushed with each other, and they are placed on the heat dissipation plate 12D, the present invention is not limited to this structure. Only the coil base 5C or the ferrites 6 can be directly placed on the heat dissipation plate 12D. With such a structure which directly places the coil base 5C on the heat dissipation plate 12D, it is necessary to manage only the flatness of the lower surface of only the coil base 5C, in order to integrate the coil base 5C and the heat dissipation plate 12D with each other, without inducing vacancies therebetween. On the other hand, with such a structure which directly places the ferrites 6 on the heat dissipation plate 12D, the heat dissipation plate 12D and the ferrites 6 with a relatively-higher heat conductivity can be integrated with each other with no vacancy interposed therebetween, which can increase the cooling effect in comparison with cases of directly placing the coil base 5C thereon. However, it goes without saying that it is most preferable that the coil base 5C and the ferrites 6 are formed such that their lower surfaces are flushed with each other, and they are placed on the flat surface of the heat dissipation plate 12D, which is the upper surface thereof.

Sixth Embodiment

Figure 15:
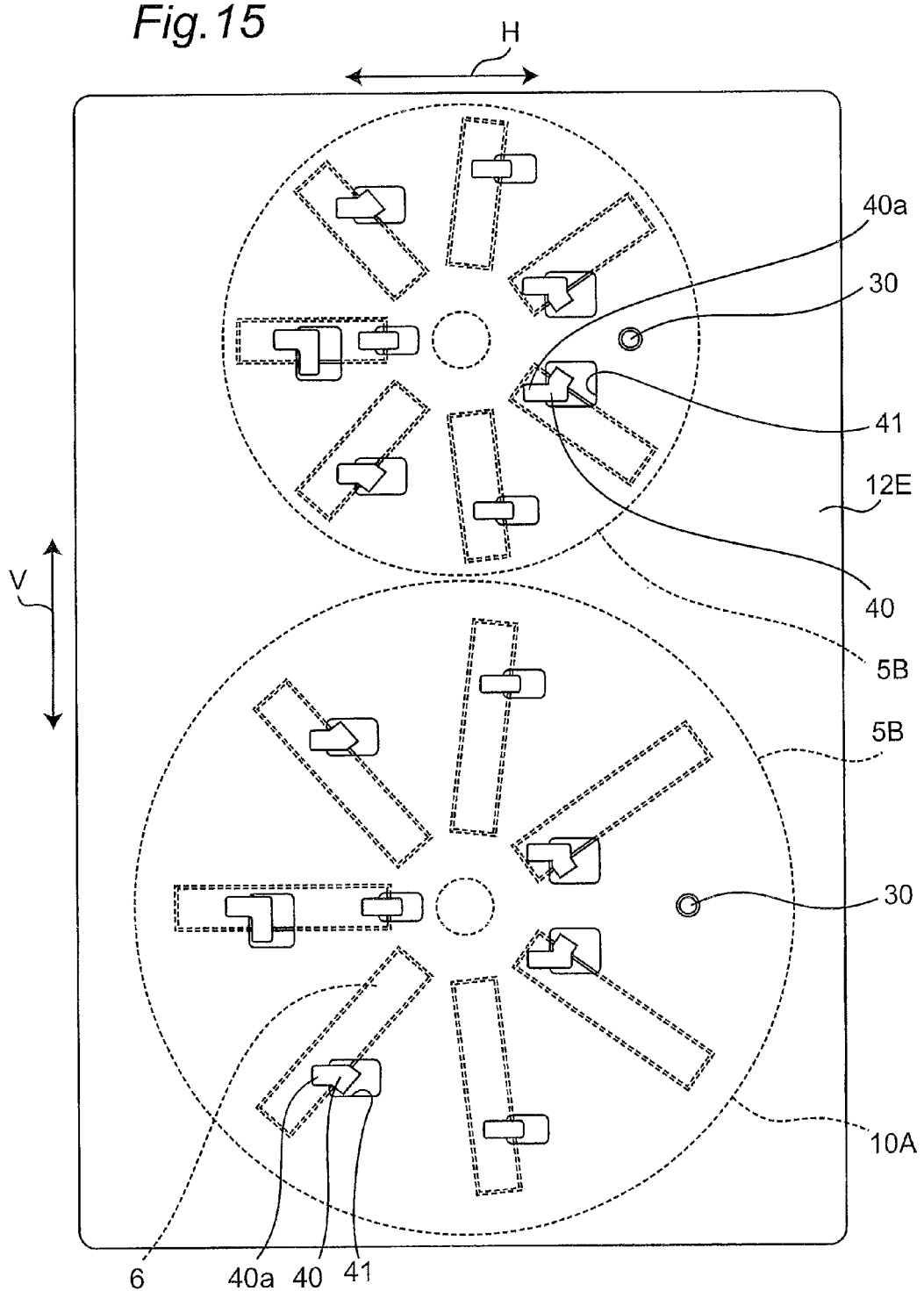
FIG. 15 is a rear view of a heat dissipation plate in an induction heating cooker according to a sixth embodiment of the present invention.
Figure 16:
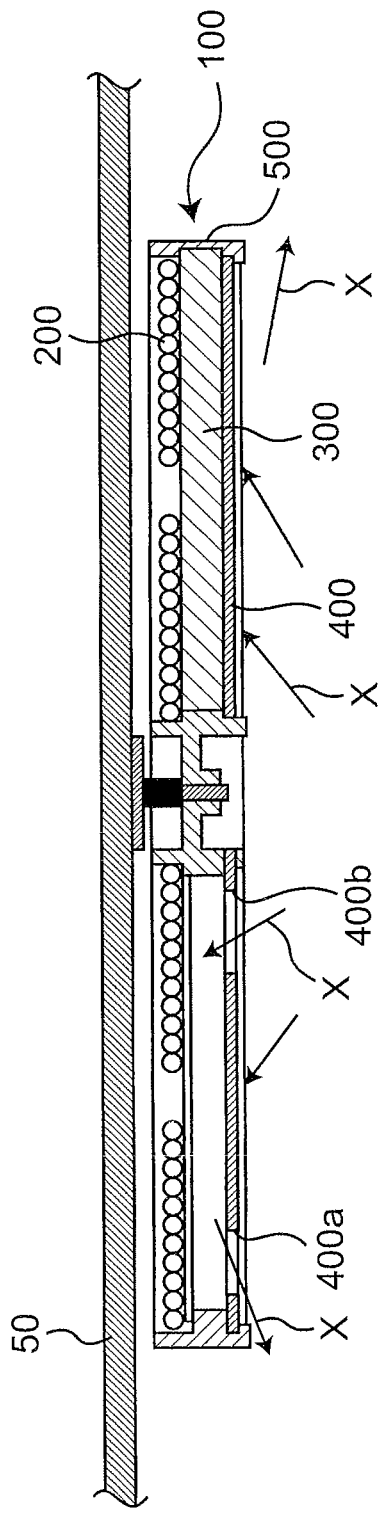
FIG. 16 is the side cross-sectional view illustrating a conventional induction heating cooker.

Next, there will be described an induction heating cooker according to a sixth embodiment of the present invention, with reference to the accompanying FIG. 15. FIG. 15 is a rear view of a heat dissipation plate in the induction heating cooker according to the sixth embodiment of the present invention. The induction heating cooker according to the sixth embodiment is different from the induction heating cooker according to the aforementioned first embodiment, in that there are provided coil units 10A and 10B having two heating coils with larger and smaller sizes, on a single heat dissipation plate 12E.

Further, the induction heating cooker according to the sixth embodiment basically has the same structure as that of the induction heating cooker according to the aforementioned first embodiment and, therefore, will be described regarding differences therefrom, hereinafter. Further, regarding the induction heating cooker according to the sixth embodiment, its elements having the same functions and structures as those of the first embodiment will be designated by the same reference characters, and will not be described in detail.

On the heat dissipation plate 12E illustrated in FIG. 15, there are placed the first coil unit 10A and the second coil unit 10B. The first coil unit 10A and the second coil unit 10B each include a heating coil 4, ferrites 6 and a coil base 5B and have the same structure, except that they have different heating outputs. For example, the first coil unit 10A has a higher output of 3.0 kW, while the second coil unit 10B has a lower output of 1.5 kW. Further, the first coil unit 10A and the second coil unit 10B have the same structure as that of the coil unit 1C (see FIG. 9) described in the aforementioned fourth embodiment and include the coil base 5B having the same structure thereas.

The coil bases 5B in the first coil unit 10A and the second coil unit 10B are each provided with plural hooks 40. As illustrated in FIG. 15, in the first coil unit 10A and the second coil unit 10B, the tip end portions 40a of the hooks 40 are protruded in a single direction along a direction (the direction of an arrow H in FIG. 15) substantially orthogonal to the direction which connects the respective centers of the first coil unit 10A and the second coil unit 10B to each other (the direction of an arrow V in FIG. 15), in the lower surface of the first coil unit 10A and the second coil unit 10B. Namely, the first coil unit 10A and the second coil unit 10B are provided in the induction heating cooker, such that the tip end portions 40a of all the hooks 40 are protruded in the same direction.

Further, the heat dissipation plate 12E, which is secured to the first coil unit 10A and the second coil unit 10B, is provided with through holes 41 at positions coincident with all the hooks 40. Accordingly, when the heat dissipation plate 12E is secured to the lower surfaces of both the first coil unit 10A and the second coil unit 10B, the heat dissipation plate 12E can be certainly secured thereto at a predetermined position, only by sliding the heat dissipation plate 12E in the rightward direction indicated by the arrow H illustrated in FIG. 15.

When the heat dissipation plate 12E is secured to the first coil unit 10A and the second coil unit 10B, as described above, it is possible to assemble them easily and certainly, if there are vacant spaces only to the left and right of the respective coil bases 5B in the direction of the arrow H.

Accordingly, there is no need for providing a space necessary for securing the heat dissipation plate 12E thereto, in the direction which connects the respective centers of the two coil units 10A and 10B to each other (the direction of the arrow V in FIG. 15), which enables setting the interval between the two coil units 10A and 10B, namely the interval between the heating coils, to be minimum. This enables reducing the size of the heat dissipation plate 12E, on which the two coil units 10A and 10B are placed, to requisite minimum.

Further, with the structure according to the sixth embodiment, the two heating coils are installed on the single heat dissipation plate 12E, which can reduce the number of components, thereby reducing the fabrication cost. This can provide an induction heating cooker with excellent assemblability (workability).

With the structure according to the sixth embodiment, the plural coil bases 5B are integrated with the single heat dissipation plate 12E through the plural hooks 40 formed in the respective coil bases 5B, which largely increases the rigidity of the heat dissipation plate 12E. Accordingly, the heat dissipation plate 12E which supports the plural coil units 10A and 10B at predetermined positions is inhibited from deforming, which reduces the variation of the distance between the heating coils and the to-be-heated object, thereby stabilizing the heating performance.

Further, while the sixth embodiment has been described with respect to an example where the two coil units 10A and 10B are placed on the single heat dissipation plate 12E, the present invention is not limited to this structure, and three or more coil units can be placed thereon, or a coil unit with a larger bore can be placed on a single heat dissipation plate, in order to cope with a larger heating coil.

Further, the induction heating cooker according to the sixth embodiment is structured, such that the coil bases 5B and the heat dissipation plate 12E are secured to and integrated with each other, by sliding the heat dissipation plate in a direction (the direction of the arrow H in FIG. 15) substantially orthogonal to the direction which connects the centers of the two coil units 10A and 10B to each other (the direction of the arrow V in FIG. 15). However, the present invention is not limited to this structure, and the direction of the protrusion of the tip end portions 40a of the hooks 40 and the direction of sliding in assembling are not limited, if there is no leeway space in the forward, rearward, leftward and rightward directions of the lower surfaces of the coil units 10A and 10B. However, it goes without saying that the direction of protrusion of the tip end portions of all the hooks is limited to a single direction.

INDUSTRIAL APPLICABILITY

The inductive heating device according to the present invention is allowed to have a reduced thickness and a reduced size and also to have a reduced space therein and, therefore, the present invention is an invention with excellent general versatility which can be adapted to various types of induction heating cookers and the like.

What is claimed is:

1. An inductive heating device comprising:
   a coil unit including a heating coil for heating a to-be-heated object, a plurality of ferrites placed under the heating coil in a vertical direction, and a coil base having plural housing holes which house the plural ferrites respectively; and
   a heat dissipation plate for directly placing the coil unit thereon, wherein:
   the coil unit comprises an electrical insulating member which is arranged between the heating coil and the ferrites to provide electrical insulation therebetween, and a heat conductive member is embedded in an area between the heating coil and the electrical insulating member and an area between the electrical insulating member and the ferrites, and wherein
   lower surfaces of the plural ferrites housed in the housing holes in the coil base are arranged to be flushed with a flat surface of a lower surface of the coil base, and
   the lower surfaces of the plural ferrites and the flat surface of the coil base are in a surface-to-surface contact with a flat surface of the heat dissipation plate which constitutes an upper surface of the heat dissipation plate;
   wherein the housing holes are provided with a positioning protrusion which is protruded from their edge portions, and the lower surfaces of the plural ferrites housed in the housing holes are placed directly on the positioning protrusions, such that the lower surfaces of the plural ferrites housed in the housing holes in the coil base are flushed with the flat surface of the lower surface of the coil base.

2. The inductive heating device according to claim 1, wherein
   the flat surface of the heat dissipation plate is formed to be larger than a profile area in a vertical direction of the coil unit and is adapted to be exposed, at an outer peripheral portion, outside the coil unit.

3. The inductive heating device according to claim 1, further comprising a fixing member for mechanically securing the coil base and the heat dissipation plate, under the heating coil in the vertical direction.

4. The inductive heating device according to claim 1, wherein
   the coil base is provided with plural hooks protruded from its lower surface in the vertical direction, and the plural hooks are adapted to penetrate through plural holes formed in the heat dissipation plate and engage with portions of the heat dissipation plate.

5. The inductive heating device according to claim 1, wherein
   the electrical insulating member is an adhesive agent having an electrical insulating property, the heat conductive member is a mica plate, and the heating coil and the coil base are directly secured to each other through the adhesive agent charged in through holes formed in the mica plate.

6. The inductive heating device according to claim 1, wherein
   the heat dissipation plate is adapted to be cooled by cooling air from a blower, such that the cooling air is caused to come into contact with only the lower surface of the heat dissipation plate in the vertical direction.

7. The inductive heating device according to claim 1, wherein
   there is placed a control circuit for controlling an output of the heating coil in an area under the heat dissipation plate in the vertical direction, and
   cooling air from the blower is brought into contact with heat generating components in the control circuit and the lower surface of the heat dissipation plate in the vertical direction, for cooling the heat generating components and the heat dissipation plate.

8. The inductive heating device according to claim 1, wherein
   the heat dissipation plate is formed such that the vertically-projected area of its flat surface is larger than the vertically-projected area of the heating coil, and the flat surface of the heat dissipation plate is placed in an area outside an outer periphery of the heating coil.

9. The inductive heating device according to claim 1, wherein
   the heat dissipation plate is provided with a concavity and convexity in its portion which is not in contact with the coil unit.

10. The inductive heating device according to claim 3, wherein
    the heating coil comprises plural substantially-concentric induction heating coils, and
    there is provided the fixing member for mechanically securing the heat dissipation plate and the coil base which are placed under the heating coil in the vertical direction, at a position under a substantially-midway point on a radial width of each induction heating coil.

11. The inductive heating device according to claim 3, wherein
    there are provided a plurality of the fixing members, and
    the distances between the respective fixing members are substantially equal distances in a circumferential direction of the heating coil.

12. The inductive heating device according to claim 3, wherein
    there are provided a plurality of the fixing members, and the fixing members are placed along plural concentric circles, such that the number of the fixing members along the concentric circle in an outer-periphery side is larger than that along the concentric circle in an inner-periphery side.

13. The inductive heating device according to claim 4, wherein
    the plural hooks, and the portions of the heat dissipation plate which engage with the plural hooks are placed under the heating coil in the vertical direction.

14. The inductive heating device according to claim 4, wherein
    the plural hooks are placed along concentric circles in the lower surface of the coil base, at substantially even intervals in the circumferential direction.

15. The inductive heating device according to claim 4, wherein
    the plural hooks are placed along plural concentric circles in the lower surface of the coil base, such that the number of the hooks placed along the concentric circle in the outer periphery side is larger than that along the concentric circle in the inner periphery side, in the coil base.

16. The inductive heating device according to claim 4, wherein
    the plural hooks have respective protruding portions protruded from the lower surface of the coil base, the protruding portions are protruded in the same direction in a plane parallel to the lower surface of the coil base, there is provided a gap between the protruding portions and the lower surface of the coil base, such that the gap is set to be equal to or slightly smaller than a thickness of the heat dissipation plate, the heat dissipation plate is press-fitted, at its portions, into the gap between the lower surface of the coil base and the protruding portions of the hooks to be secured thereto, by penetrating the hooks through the holes formed in the heat dissipation plate, and sliding the heat dissipation plate in a direction opposite from the direction of the protrusion of the hooks.

17. The inductive heating device according to claim 16, wherein the coil base and the heat dissipation plate are secured to each other through a fixing member, after the portions of the heat dissipation plate are press-fitted into the gap between the lower surface of the coil base and the protruding portions of the hooks to be secured thereto.

18. The inductive heating device according to claim 1, wherein the heat dissipation plate on which the coil unit is placed is adapted to define only an area thereunder in the vertical direction as a cooling space for passing, therethrough, cooling air from a blower, such that cooling air from the blower directly cools the heat dissipation plate only at is lower surface in the vertical direction, together with heat generating components in a control device placed in the cooling space, and heat from the heating coil is cooled through the heat dissipation plate.

\* \* \* \* \*